US012659093B2

(12) United States Patent
Ali et al.

(10) Patent No.: US 12,659,093 B2
(45) Date of Patent: Jun. 16, 2026

(54) TRANSMISSION USING AN ADAPTED DOWNLINK WAVEFORM TYPE

(71) Applicant: Lenovo (Singapore) PTE. LTD., New Tech Park (SG)

(72) Inventors: Ali Ramadan Ali, Kraiburg am Inn (DE); Karthikeyan Ganesan, Kronberg im Taunus (DE); Alexander Johann Maria Golitschek Edler Von Elbwart, Darmdstadt (DE); Vijay Nangia, Woodridge, IL (US); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 515 days.

(21) Appl. No.: 17/764,499

(22) PCT Filed: Sep. 17, 2020

(86) PCT No.: PCT/IB2020/058650
§ 371 (c)(1),
(2) Date: Mar. 28, 2022

(87) PCT Pub. No.: WO2021/084333
PCT Pub. Date: May 6, 2021

(65) Prior Publication Data
US 2022/0345261 A1 Oct. 27, 2022

Related U.S. Application Data

(60) Provisional application No. 62/928,649, filed on Oct. 31, 2019.

(51) Int. Cl.
*H04L 5/00* (2006.01)
*H04W 74/0833* (2024.01)

(52) U.S. Cl.
CPC .......... *H04L 5/0044* (2013.01); *H04L 5/0048* (2013.01); *H04L 5/0053* (2013.01); *H04L 5/0094* (2013.01); *H04W 74/0833* (2013.01)

(58) Field of Classification Search
CPC ... H04L 5/0044; H04L 5/0048; H04L 5/0053; H04L 5/0094; H04L 5/006; H04L 5/0078;
(Continued)

(56) References Cited

U.S. PATENT DOCUMENTS 9,525,540 B1 * 12/2016 Shellhammer ........ H04L 5/0053
9,847,897 B1 12/2017 Cheng et al.
(Continued)

FOREIGN PATENT DOCUMENTS

CN 114531957 A * 5/2022 ............ H04W 72/23
WO WO-2018062717 A1 * 4/2018 ......... H01L 27/2666
(Continued)

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.
(Continued)

*Primary Examiner* — Shean Tokuta
(74) *Attorney, Agent, or Firm* — Kunzler Needham Hilton

(57) ABSTRACT

Apparatuses, methods, and systems are disclosed for transmission using an adapted downlink waveform type. One method (3400) includes dynamically or semi-statically adapting (3402) a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel trans-
(Continued)

mission, or a combination thereof. The method (3400) includes transmitting (3404) the transmission using a downlink waveform pattern comprising the downlink waveform type.

19 Claims, 29 Drawing Sheets

(58) Field of Classification Search
CPC ... H04L 5/0082; H04L 5/0096; H04L 5/0023; H04L 5/0007; H04L 5/0005; H04L 5/0006; H04L 27/2613; H04L 27/2636; H04W 74/0833; H04W 24/10; H04W 72/23; H04W 74/006; H04W 74/0006
See application file for complete search history.

(56) References Cited

U.S. PATENT DOCUMENTS

| | | | | |
|---|---|---|---|---|
| 9,883,511 | B1 * | 1/2018 | Yang | H04W 52/267 |
| 10,397,947 | B2 | 8/2019 | Luo et al. | |
| 11,632,788 | B2 * | 4/2023 | Li | H04W 72/1268 |
| | | | | 370/329 |
| 2017/0181127 | A1 * | 6/2017 | Hampel | H04W 52/18 |
| 2018/0049233 | A1 * | 2/2018 | Luo | H04W 72/23 |
| 2018/0092095 | A1 * | 3/2018 | Zeng | H04L 5/0007 |
| 2018/0131554 | A1 * | 5/2018 | Liu | H04L 27/362 |
| 2018/0205528 | A1 * | 7/2018 | Bai | H04L 5/0092 |
| 2018/0287840 | A1 * | 10/2018 | Akkarakaran | H04L 27/262 |
| 2018/0294916 | A1 * | 10/2018 | Akkarakaran | H04L 5/0092 |
| 2019/0021071 | A1 * | 1/2019 | Islam | H04W 56/0005 |
| 2019/0110277 | A1 * | 4/2019 | Bhattad | H04L 5/0053 |
| 2019/0173701 | A1 | 6/2019 | Ma et al. | |
| 2019/0261315 | A1 | 8/2019 | Zhang et al. | |
| 2019/0296950 | A1 * | 9/2019 | Murakami | H04L 5/0048 |
| 2019/0326964 | A1 * | 10/2019 | Li | H04L 27/26 |
| 2020/0059387 | A1 * | 2/2020 | Murakami | H04L 5/0007 |
| 2020/0145067 | A1 * | 5/2020 | Murakami | H04B 7/0413 |
| 2020/0186311 | A1 * | 6/2020 | Xu | H04L 5/0007 |
| 2020/0295979 | A1 * | 9/2020 | Saito | H04W 72/23 |
| 2020/0412590 | A1 * | 12/2020 | Akkarakaran | H04L 27/26136 |
| 2021/0258097 | A1 * | 8/2021 | Landis | H04W 24/08 |
| 2021/0281455 | A1 * | 9/2021 | Lee | H04L 27/2636 |
| 2022/0338197 | A1 * | 10/2022 | Zeng | H04L 5/001 |
| 2022/0345261 | A1 * | 10/2022 | Ali | H04L 5/0048 |

FOREIGN PATENT DOCUMENTS

| | | | | | |
|---|---|---|---|---|---|
| WO | WO-2018120875 | A1 * | 7/2018 | | H04B 7/0691 |
| WO | WO-2019029338 | A1 * | 2/2019 | | H04W 72/30 |
| WO | WO-2019184884 | A1 * | 10/2019 | | H04W 74/0808 |
| WO | WO-2020264027 | A1 * | 12/2020 | | H01L 27/26136 |
| WO | WO-2021084333 | A1 * | 5/2021 | | H04W 72/23 |

OTHER PUBLICATIONS

PCT/IB2020/058650, "International Search Report", PCT, Feb. 8, 2021, pp. 1-6.

PCT/IB2020/058650, "Written Opinion of the International Searching Authority", PCT, Feb. 8, 2021, pp. 1-11.

3GPP, "3rd Generation Partnership Project; Technical Specification Group Radio Access Network; NR; Physical channels and modulation (Release 15)".

3GPP, "3rd Generation Partnership Project; Technical Specification Group Radio Access Network; Study on requirements for NR beyond 52.6 GHZ (Release 16)", 3GPP TR 38.807 V1.0.0, Sep. 2019, pp. 1-65.

* cited by examiner

200

300

Network Unit
104

Processor
302

Memory
304

Input Device
306

Display
308

Transmitter
310

Receiver
312

400

| | | | |
|---|---|---|---|
| | 408 | 408 | 408 |
| | 410 | 410 | 410 |
| | 408 | 408 | 408 |
| | 408 | 408 | 408 |
| | 408 | | 408 |
| 404 | 410 | 406 | 410 |
| | 408 | | 408 |
| | 408 | | 408 |
| | 408 | | 408 |
| | 410 | | 410 |
| | 408 | | 408 |
| | 408 | | 408 |
| | 408 | | 408 |
| | 410 | | 410 |
| | 408 | | 408 |
| | 408 | | 408 |
| | 408 | | 408 |
| | 410 | | 410 |
| | 408 | 408 | 408 |
| | 408 | 408 | 408 |
| | 410 | 410 | 410 |
| | 408 | 408 | 408 |

1300

1312    1314    1316

1308, 1310, 1304, 1306

1500

1600

| | 1608 | 1608 | 1608 |
|---|---|---|---|
| | 1610 | 1610 | 1610 |
| | 1608 | 1608 | 1608 |
| | 1608 | 1608 | 1608 |
| | 1608 | | 1608 |
| | 1610 | | 1610 |
| | 1608 | | 1608 |
| | 1608 | | 1608 |
| | 1608 | | 1608 |
| | 1610 | | 1610 |
| 1604 | 1608 | 1606 | 1608 |
| | 1608 | | 1608 |
| | 1608 | | 1608 |
| | 1610 | | 1610 |
| | 1608 | | 1608 |
| | 1608 | | 1608 |
| | 1608 | | 1608 |
| | 1610 | | 1610 |
| | 1608 | 1608 | 1608 |
| | 1608 | 1608 | 1608 |
| | 1610 | 1610 | 1610 |
| | 1608 | 1608 | 1608 |

1612

1614

1700

1712

1710

1706 1708 1708 1708 1708 1708 1708 1706 1708 1708 1708 1708 1708

1714

1702 1704 1704

1614

1900

1910

1906    1906    1908    1906

1902    1904    1902    1902

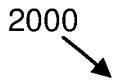
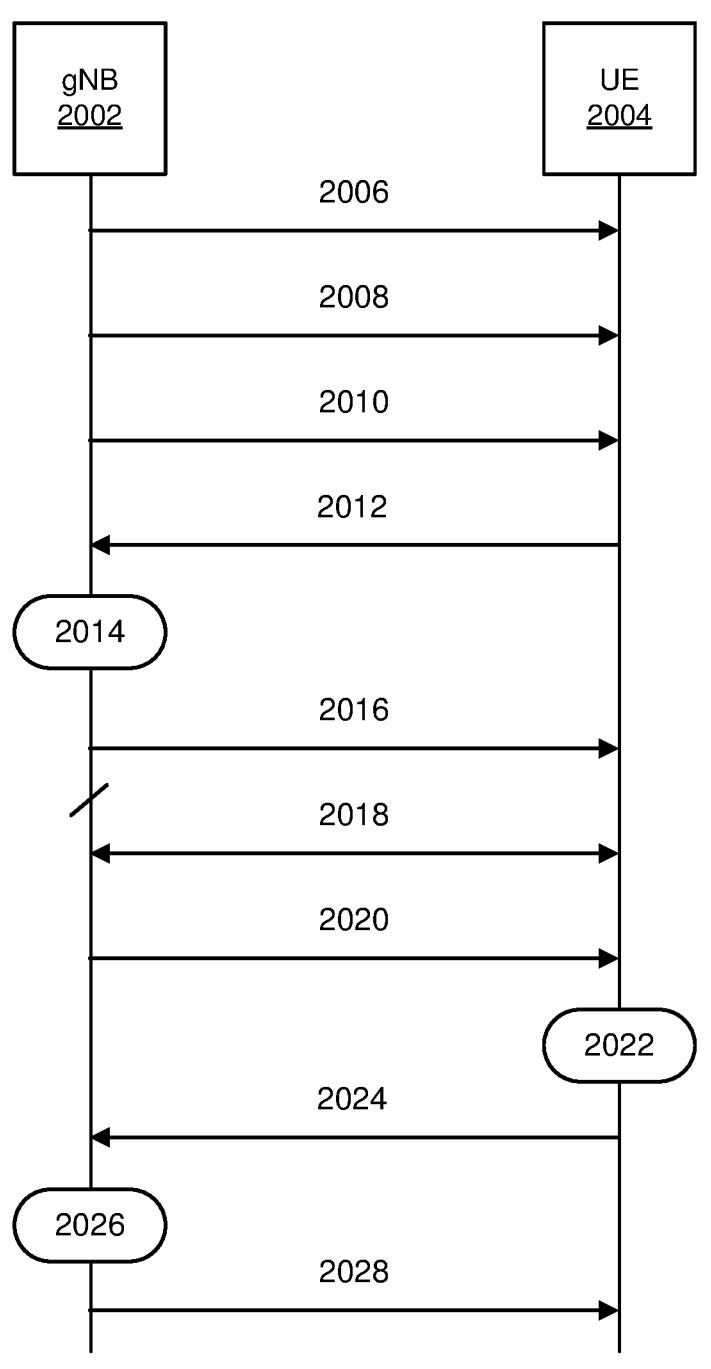
FIG. 20

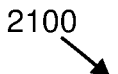
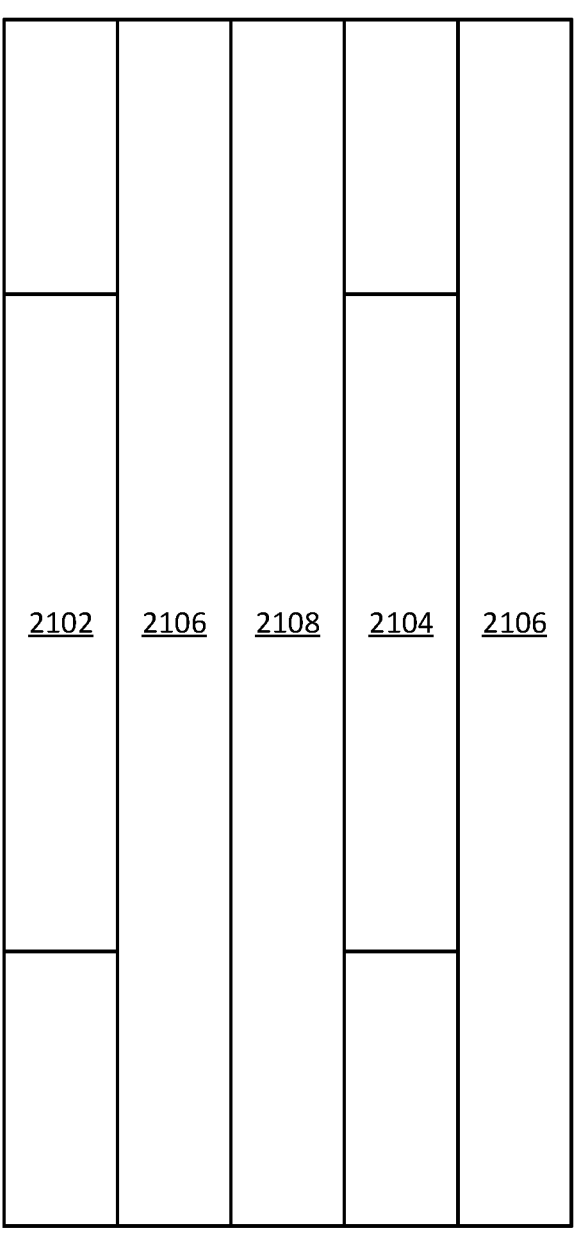
FIG. 21

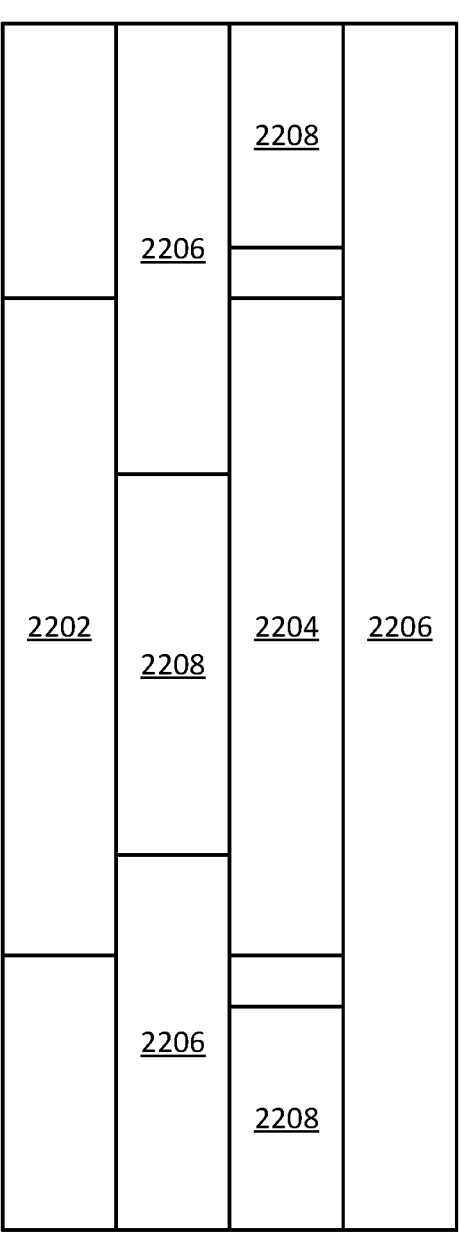
FIG. 22

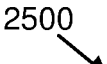
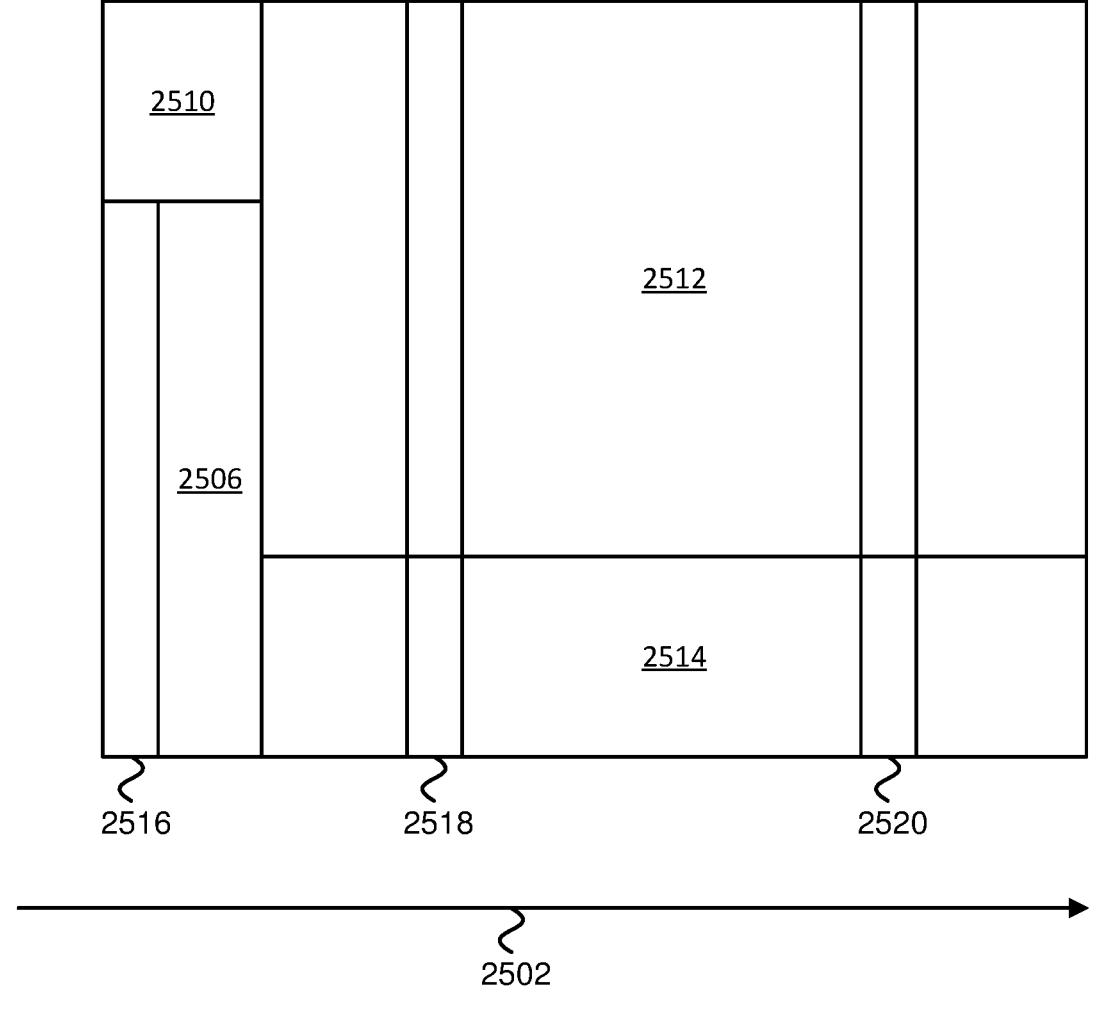
FIG. 25

2800

| 2806 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2810 | 2810 | 2810 | 2812 | 2810 | 2810 | 2810 | 2812 | 2810 | 2810 |
| 2808 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2810 | 2810 | 2810 | 2812 | 2810 | 2810 | 2810 | 2812 | 2810 | 2810 |
| 2806 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2810 | 2810 | 2810 | 2812 | 2810 | 2810 | 2810 | 2812 | 2810 | 2810 |
| 2808 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2810 | 2810 | 2810 | 2812 | 2810 | 2810 | 2810 | 2812 | 2810 | 2810 |
| 2806 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2810 | 2810 | 2810 | 2812 | 2810 | 2810 | 2810 | 2812 | 2810 | 2810 |
| 2808 | 2810 | 2810 | 2810 | 2810 | 2810 | 2810 | 2810 | 2810 | 2810 | 2810 | 2810 | 2810 | 2810 |
| 2806 | 2810 | 2812 | 2810 | 2814 | 2810 | 2810 | 2812 | 2810 | 2810 | 2810 | 2812 | 2810 | 2810 |

2804

2802

2900
2902
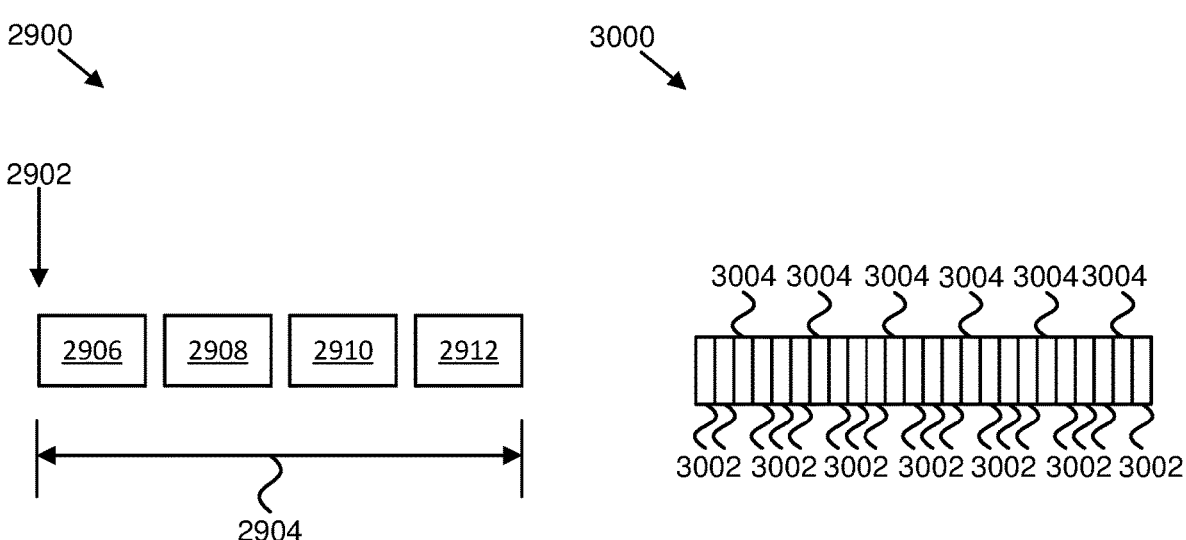
FIG. 29
3000
FIG. 30
3100
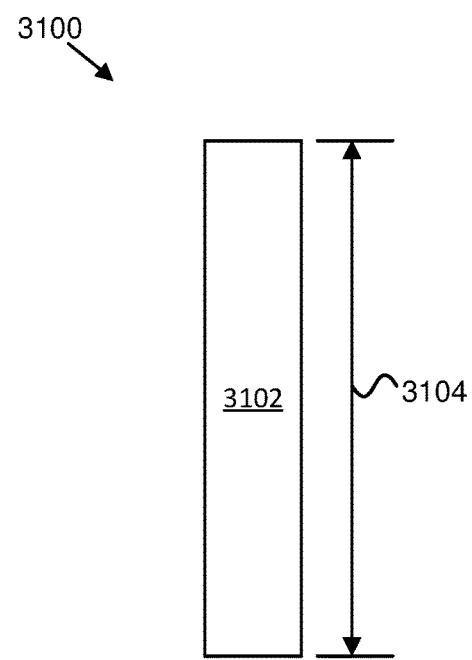
FIG. 31

3500

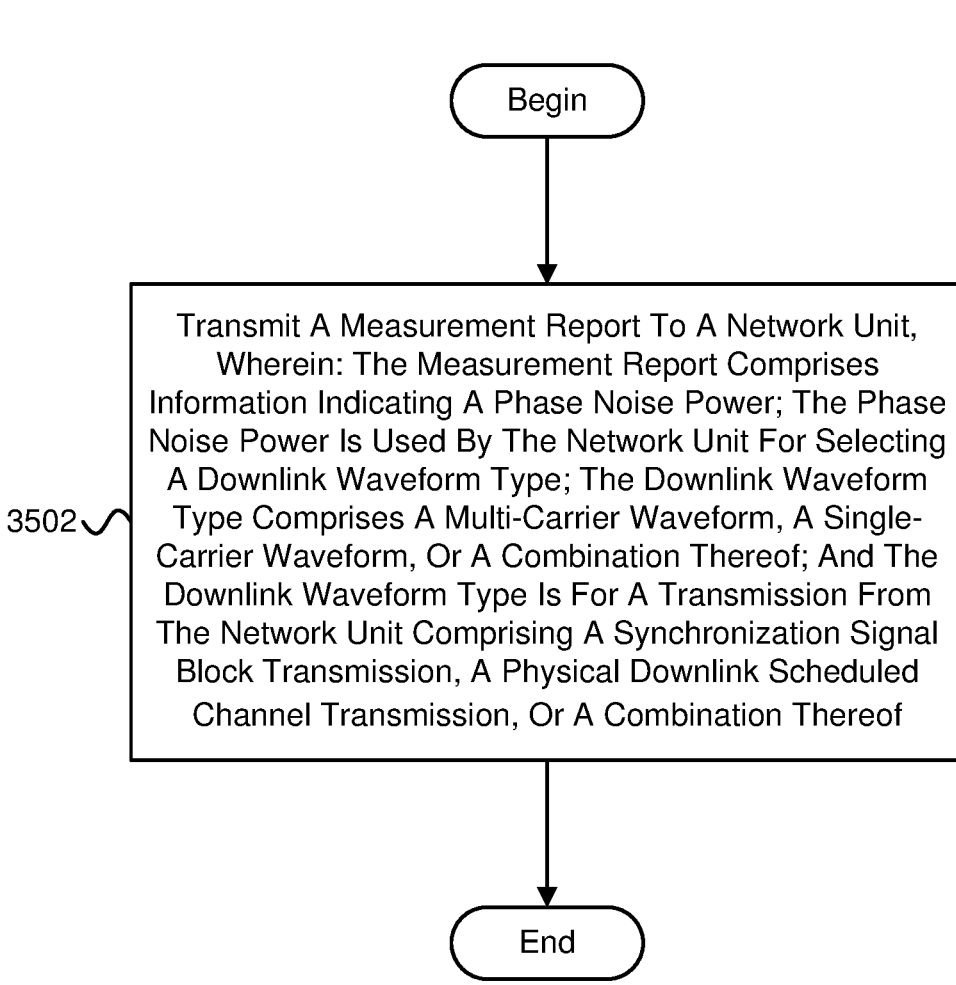

Begin

3502

Transmit A Measurement Report To A Network Unit,
Wherein: The Measurement Report Comprises
Information Indicating A Phase Noise Power; The Phase
Noise Power Is Used By The Network Unit For Selecting
A Downlink Waveform Type; The Downlink Waveform
Type Comprises A Multi-Carrier Waveform, A Single-
Carrier Waveform, Or A Combination Thereof; And The
Downlink Waveform Type Is For A Transmission From
The Network Unit Comprising A Synchronization Signal
Block Transmission, A Physical Downlink Scheduled
Channel Transmission, Or A Combination Thereof End

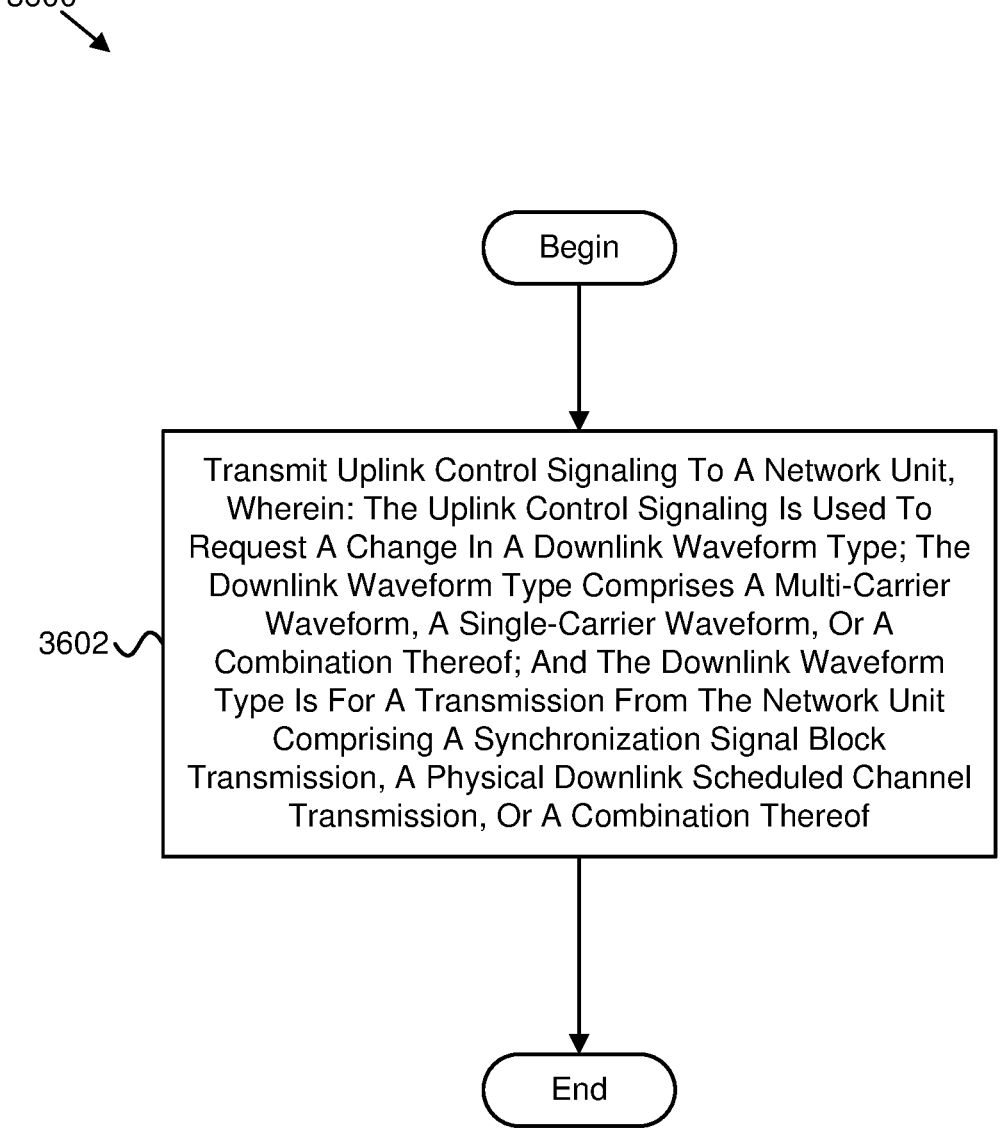

Begin

3602

Transmit Uplink Control Signaling To A Network Unit, Wherein: The Uplink Control Signaling Is Used To Request A Change In A Downlink Waveform Type; The Downlink Waveform Type Comprises A Multi-Carrier Waveform, A Single-Carrier Waveform, Or A Combination Thereof; And The Downlink Waveform Type Is For A Transmission From The Network Unit Comprising A Synchronization Signal Block Transmission, A Physical Downlink Scheduled Channel Transmission, Or A Combination Thereof End

TRANSMISSION USING AN ADAPTED DOWNLINK WAVEFORM TYPE

CROSS-REFERENCE TO RELATED APPLICATIONS

This application claims priority to U.S. Patent Application Ser. No. 62/928,649 entitled "APPARATUSES, METHODS, AND SYSTEMS FOR MULTIPLE WAVEFORM SUPPORT AT B52.6 GHZ" and filed on Oct. 31, 2019 for Ali Ramadan Ali, which is incorporated herein by reference in its entirety.

FIELD

The subject matter disclosed herein relates generally to wireless communications and more particularly relates to transmission using an adapted downlink waveform type.

BACKGROUND

The following abbreviations are herewith defined, at least some of which are referred to within the following description: Third Generation Partnership Project ("3GPP"), 5th Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Additive White Gaussian Noise ("AWGN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Cubic Metric ("CM"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Device to Device ("D2D"), Discrete Fourier Transform ("DFT"), Discrete Fourier Transform Spread ("DFTS"), Discrete Fourier Transform Spread Orthogonal Frequency Division Multiplexing ("DFT-s-OFDM"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Equalization ("FDE"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Hardware ("HW"), Integrated Access and Backhaul ("IAB"), Identity or Identifier ("ID"), Inverse DFT ("IDFT"), Information Element ("IE"), Industrial IoT ("IIoT"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Line of Sight ("LOS"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Peak-to-Average Power Ratio ("PAPR"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Path Loss ("PL"), Public Land Mobile Network ("PLMN"), Phase Noise ("PN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Primary Synchronization Signal ("PSS"), Phase Tracking Reference Signal ("PT-RS"), Physical Uplink Control Channel ("PUCCH"), Physical Uplink Shared Channel ("PUSCH"), Quadrature Amplitude Modulation ("QAM"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element ("RE"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Reference Signal Received Quality ("RSRQ"), Received Signal Strength Indicator ("RSSI"), Round Trip Time ("RTT"), Receive ("RX"), Single Carrier ("SC"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NS-SAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Secondary Synchronization Signal ("SSS"), Subscription Concealed Identifier ("SUCI"), Scheduling User Equipment ("SUE"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), Waveform Frequency ("WF"), and Worldwide Interoperability for Microwave Access ("WiMAX").

In certain wireless communications networks, different waveform types may be used.

BRIEF SUMMARY

Methods for transmission using an adapted downlink waveform type are disclosed. Apparatuses and systems also perform the functions of the methods. One embodiment of a method includes dynamically or semi-statically adapting a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof. In some embodiments, the method includes transmitting the transmission using a downlink waveform pattern comprising the downlink waveform type.

One apparatus for transmission using an adapted downlink waveform type includes a processor that dynamically or semi-statically adapts a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof. In various embodiments, the apparatus includes a transmitter that transmits the transmission using a downlink waveform pattern comprising the downlink waveform type.

Another embodiment of a method for transmission includes transmitting a measurement report to a network unit, wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

Another apparatus for transmission includes a transmitter that transmits a measurement report to a network unit, wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

Yet another embodiment of a method for transmission includes transmitting uplink control signaling to a network unit, wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

Yet another apparatus for transmission includes a transmitter that transmits uplink control signaling to a network unit, wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

And yet another embodiment of a method includes modifying at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

And yet another apparatus includes a processor that modifies at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 20 is a communications diagram illustrating one embodiment of a signalling procedure for waveform selection;

FIG. 21 is a diagram illustrating one embodiment of SSB design for DFT-s-OFDM (e.g., option 1);

FIG. 22 is a diagram illustrating another embodiment of SSB design for DFT-s-OFDM (e.g., option 2);

FIG. 25 is a diagram illustrating a continuation of the PDCCH design of FIGS. 23 and 24;

FIG. 29 is a diagram illustrating a continuation of the prior DFT PT-RS mapping for the PDCCH of FIG. 28;

FIG. 30 is a diagram illustrating a continuation of the prior DFT PT-RS mapping for the PDCCH of FIGS. 28 and 29;

FIG. 31 is a diagram illustrating a continuation of the prior DFT PT-RS mapping for the PDCCH of FIGS. 28, 29, and 30;

FIG. 35 is a flow chart diagram illustrating another embodiment of a method for transmission;

FIG. 36 is a flow chart diagram illustrating yet another embodiment of a method for transmission.

DETAILED DESCRIPTION

Figure 1:
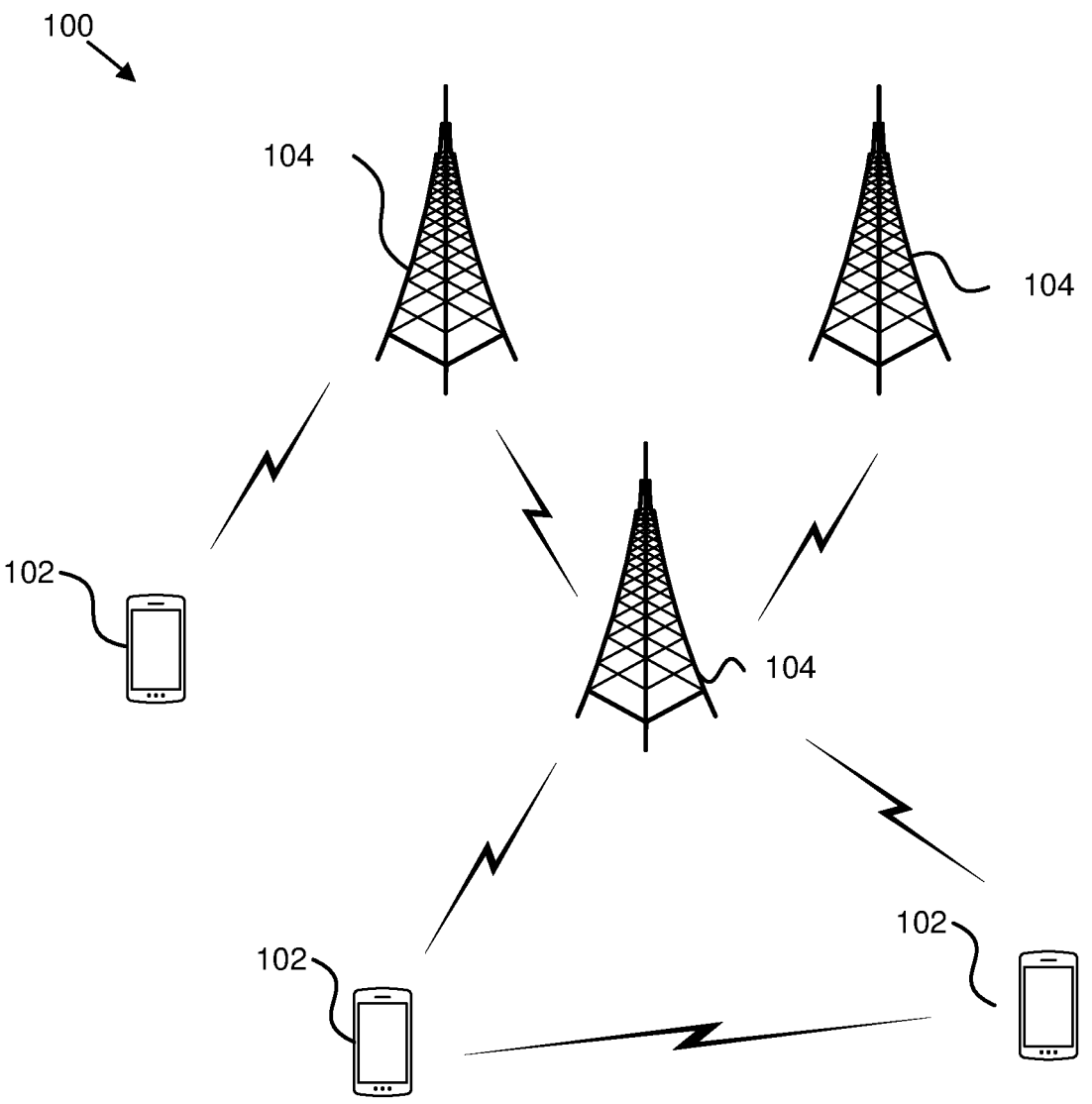
FIG. 1 is a schematic block diagram illustrating one embodiment of a wireless communication system for transmission using an adapted downlink waveform type.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmission using an adapted downlink waveform type. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may dynamically or semi-statically adapt a downlink waveform type at the network unit 104, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof. In some embodiments, the network unit 104 may transmit the transmission using a downlink waveform pattern comprising the downlink waveform type. Accordingly, the network unit 104 may be used for transmission using an adapted downlink waveform type.

In certain embodiments, a remote unit 102 may transmit a measurement report to a network unit (e.g., network unit 104), wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof. Accordingly, the remote unit 102 may be used for transmission.

In some embodiments, a remote unit 102 may transmit uplink control signaling to a network unit (e.g., network unit 104), wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof. Accordingly, the remote unit 102 may be used for transmission.

In various embodiments, a remote unit 102 and/or a network unit 104 may modify at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof. Accordingly, the remote unit 102 and/or the network unit 104 may be used for modifying a channel structure.

Figure 2:
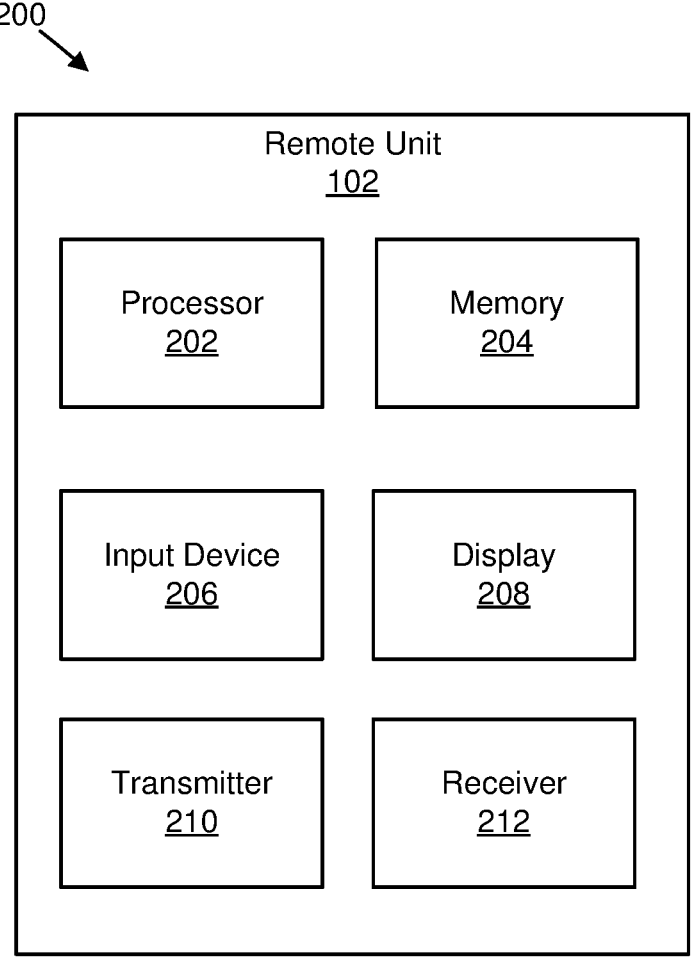
FIG. 2 is a schematic block diagram illustrating one embodiment of an apparatus that may be used for transmission using an adapted downlink waveform type.

FIG. 2 depicts one embodiment of an apparatus 200 that may be used for transmission using an adapted downlink waveform type. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the transmitter 210 may transmit a measurement report to a network unit (e.g., network unit 104), wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In certain embodiments, the transmitter 210 may transmit uplink control signaling to a network unit (e.g., network unit 104), wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

The processor 202 may modify at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
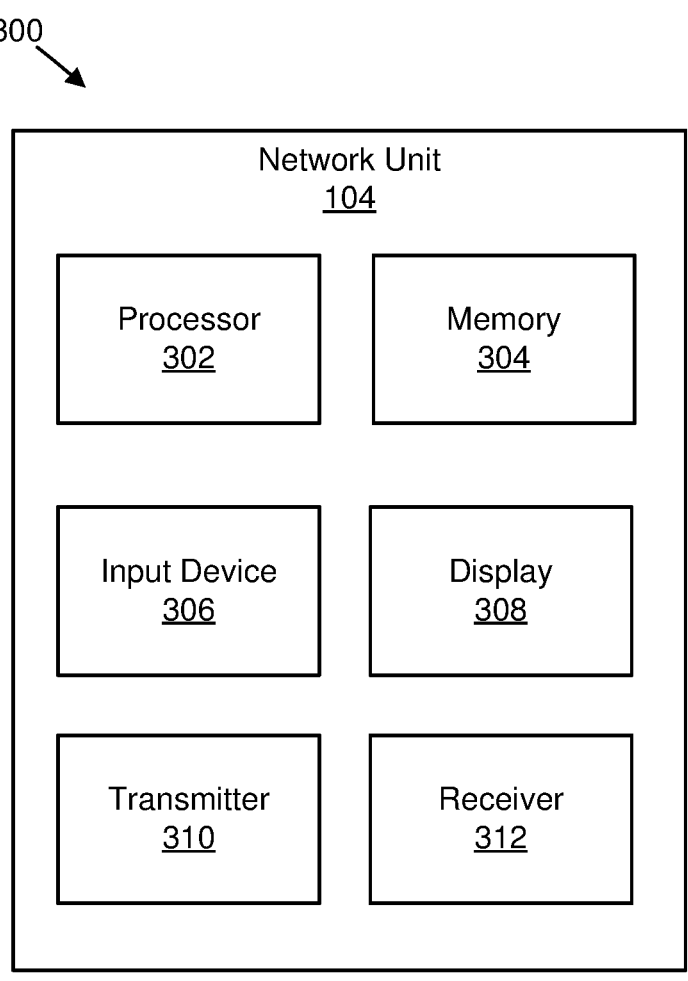
FIG. 3 is a schematic block diagram illustrating one embodiment of an apparatus that may be used for transmission using an adapted downlink waveform type.

FIG. 3 depicts one embodiment of an apparatus 300 that may be used for transmission using an adapted downlink waveform type. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 may dynamically or semi-statically adapt a downlink waveform type at a network unit (e.g., network unit 104), wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof. In various embodiments, the transmitter 310 may transmit the transmission using a downlink waveform pattern comprising the downlink waveform type.

The processor 302 may modify at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

In certain embodiments, the transmitter 310 may be used for transmitting information described herein and/or the processor 302 may be used for processing information described herein.

In various embodiments, a system may have a high path loss. In such systems, RF components of a transmitter and/or a receiver may exhibit nonlinear transfer characteristics which lead to further system degradation. Certain embodiments described herein may improve upon such deficiencies.

In some embodiments, multi-carrier (e.g., OFDM) based waveforms may be used for DL and/or UL transmissions. In certain embodiments, such as at a cell edge, a single carrier (e.g., DFT-s-OFDM) may be used for UL transmissions. In various embodiments, CP-OFDM performance may degrade at high frequencies (e.g. B52.6 GHz) due to its sensitivity to phase noise and its high PAPR or CM that limits cell coverage. In some embodiments, problems of CP-OFDM at high frequencies may become severe as a modulation order and/or a channel bandwidth increases. In such embodiments, some physical layer channels may be affected more than others.

In certain embodiments, a single carrier waveform may be a suitable candidate at high frequencies due to its natural robustness against phase noise and its low PAPR or CM. In various embodiments, power constraints of a UE at cell edges may necessitate enhancement of UL transmissions as well by adopting other single carrier waveforms such as SC-QAM, SC-FDE, and/or CP-SC for cell edge scenarios.

In some embodiments, while using DFT-s-OFDM or other single carrier candidates for DL enhances of cell coverage, DFT-s-OFDM or other single carrier candidates may limit MIMO capabilities of a system and/or may reduce flexibility of DMRS mapping. In certain embodiments, such as high data rate eMBB, a high channel bandwidth may be required for high throughput. In such embodiments, MIMO may play an important rule. In various embodiments, such as in factory automation and/or IIoT applications, latency, massive access, and reliability may be main KPIs. In some embodiments, backhauling and/or IAB work mostly under LOS conditions in which fading and power consumption is not a major issue. In certain embodiments, mobile data offloading may require coexistence with other systems (e.g., wifi @60 GHz). In various embodiments, such as for short-range high-data rate D2D communications, coverage may be limited and a PAPR problem may not be significant. In some embodiments, a trade-off between cell coverage requirements and QoS requirements in terms of latency and throughput may be considered to support different deployment and use scenarios.

In certain embodiments, multiple waveforms may be used. In such embodiments, a gNB may switch between multicarrier CP-OFDM and single carrier DFT-s-OFDM via RRC configuration. In such embodiments, a higher layer parameter transformPrecoder in pusch-Config, configuredGrantConfig, or msg3-transformPrecoderin RACH-ConfigCommon may provide an indication to enable and/or disable a transform pre-coder for PUSCH. In various embodiments, a UE may consider a transform precoding either 'enabled' or 'disabled' based on reading messages, and a gNB may apply simultaneous receptions of multiple UEs with different waveforms.

In some embodiments, such as for DL having multiple waveforms selected by a gNB based on some parameters such as the used carrier frequency, UE measurement (e.g., RSRP, RSRQ, SINR), location, UE and gNB RF capabilities, UE power status (e.g., PH report), and/or UE assistance information (e.g., DL transform precoding recommendation based on a PL estimate), a UE battery may help a gNB to choose the right WF, since some waveforms require higher signal processing reception complexity than others, and thus save some UE power based on a critical battery power status.

In certain embodiments, an SS block includes PSS, SSS and PBCH and is transmitted periodically with 5 ms to 160 ms periodicity. In various embodiments, beam sweeping may be applied to an SS block transmission, so it may be possible to transmit SS block with different beams with time multiplexing. In some embodiments, a set of SS blocks within a beam sweep is referred to as an SS burst set and an SS block period may be a time between SS block transmission within a specific beam which is a periodicity of the SS burst set. In various embodiments, SS burst set periodicity may be flexible with a minimum period of 5 ms to a maximum period of 160 ms and each SS burst set may be confined to a 5 ms time interval.

In certain embodiments, a maximum number of SS blocks within an SS burst set may be different for a different frequency range. For example, for frequency bands below 3 GHz, there may be up to 4 SS blocks within an SS burst set, thus enabling SS block beam sweeping over up to 4 beams. As another example, for frequency bands between 3 GHz and 6 GHz, there may be up to 8 SS blocks within an SS burst set, thus enabling SS block beam sweeping over up to 8 beams. In a further example, for frequency bands over 6 GHz (e.g., FR2), there may be up to 64 SS blocks within an SS burst set, thus enabling SS block beam sweeping over up to 64 beams In some embodiments, a time domain location of an SS block may depend on an SS block numerology and possible candidate locations in a slot may be a first SS block location corresponding to symbol 2 and symbol 5, and a second possible SS block location may correspond to symbol 8 to symbol 11. In various embodiments, first and last two symbols in a slot may not be used for SS block transmission since they are used for transmitting DL and UL control signaling. In certain embodiments, an SS block time index identifies an SS block location within an SS burst set and a half-frame bit identifies the SS block in the first or second 5 ms of a 10 ms frame. In such embodiments, the SS block time index is different for different SS blocks in a burst set. Furthermore, the SSB block does not need to be transmitted at the center frequency of a carrier and the offset from a PBCH payload may indicate an offset between the SS block and a common resource block grid while SIB1 indicates an absolute location of an SS block in a carrier.

Figure 4:
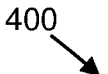
FIG. 4 is a diagram illustrating one embodiment of an SSB structure for CP-OFDM.

FIG. 4 is a diagram illustrating one embodiment of an SSB structure 400 for CP-OFDM. The SSB structure 400 as shown in FIG. 4 occupies in total 20 RBs, and spans 4 OFDM symbols. The first symbol is used for primary synchronization signal 404, the second and fourth symbols are used for PBCH 408 and DMRS 410, while the third symbol is used for secondary synchronization symbol 406 multiplexed with the rest of PBCH 408 and DMRS 410 in the frequency domain. Table 1 shows one embodiment of a correspondence between a numerology and an SSB bandwidth.

TABLE 1

| Numerology (KHz) | SSB Bandwidth (MHz) |
|---|---|
| 15 | 3.6 |
| 30 | 7.2 |
| 120 | 28.8 |
| 240 | 57.6 |

In certain embodiments, to enable high system flexibility and optimize performance in terms of coverage and throughput for different deployment and use scenarios, a waveform switching scheme at frequencies above 52.6 GHz for DL transmissions and/or UL transmissions may be used. In such embodiments, a gNB switches between CP-OFDM and a single carrier waveform such as DFT-s-OFDM for DL transmissions and between DFT-s-OFDM, SC-FDE, and/or CP-SC for UL transmissions based on a TA and a UE measurement report. As may be appreciated, a single carrier waveform such as DFT-s-OFDM and SC-FDE may have a low PAPR compared with OFDM and may thus improve coverage of a network. However, OFDM may have better support for MIMO, better spectrum efficiency, and a more efficient RS placement in a time-frequency grid than SC waveforms. On the other hand, some UEs may be equipped with only one waveform for simplicity. Therefore, multi waveform support for DL and UL transmissions may be a practical solution to accommodate variant deployment, coverage, and use scenarios. In some embodiments, adopting DFT-s-OFDM for DL transmissions may require modifications of physical layer channels, signals, and/or procedures. Certain embodiments described herein relate to implementations of different DL channels to support DFT-s-OFDM.

It should be noted that although DFT-s-OFDM is used as an example for a single carrier waveform to explain different embodiments, other single carrier waveform designs are not precluded.

In a first embodiment, multiple waveforms (e.g., single carrier and multi-carrier) may be configured for a BS (e.g., gNB) and a UE. In such an embodiment, the UE may perform waveform switching (e.g., the UE may use FDM and/or TDM)

In the first embodiment, various options for multiple waveform support for the gNB and the UE may be used. As an example, existing baseband HW for the gNB and/or the UE may be upgraded to support FR4 and may support both multiple and single carrier waveforms for DL transmissions, and new baseband HW for the UE may support only one waveform. In the first embodiment, multiple waveforms for certain data channels and/or control channels may be semistatically configured for a BWP and may be signaled to the UE or dynamically switched based on a measurement report.

In a first option corresponding to the first embodiment, an SS burst set may be alternatively, or using a pre-determined pattern, transmitted with a single carrier and multicarrier waveform to benefit UEs supporting only one waveform (e.g., for initial access). As an example, if there are 64 SS blocks in a burst set, then a 64 SS block of one burst set is transmitted first with a single carrier waveform while after that the next 64 SS block in a burst set is transmitted with a multi-carrier waveform. In the first option, a semi-static DL slot configuration may be used to schedule PDSCH with one of the waveforms.

In a second option corresponding to the first embodiment, an SS block may be alternatively transmitted with a single carrier waveform and a multi-carrier waveform. As an example, odd numbered SS blocks are transmitted with the single carrier waveform in a burst set and even numbered SS blocks are transmitted with a multi-carrier waveform in a burst set and this is reversed for the next burst set, where odd numbered SS block are be transmitted with a multi-carrier waveform while even numbered SS blocks are transmitted with a single carrier waveform.

In the first and second options, an SSB may carry an indication of the pattern used to alternate the waveform for the different burst sets. This may enable the UE to skip the SSBs or burst sets that use non-supported waveforms. In one example, PSS, SSS, and/or a combination of PSS/SSS may indicate a periodicity of a pattern, or a payload in a PBCH may indicate the periodicity of the pattern.

As may be appreciated, one or more of the above options or portions of the above options may be combined.

FIGS. 5 through 8 illustrate one embodiment of the first four SS blocks in a first burst set according to the second option, and FIGS. 9 through 12 illustrate one embodiment of the first four SS blocks in a second burst set according to the second option.

Figures 5, 6:
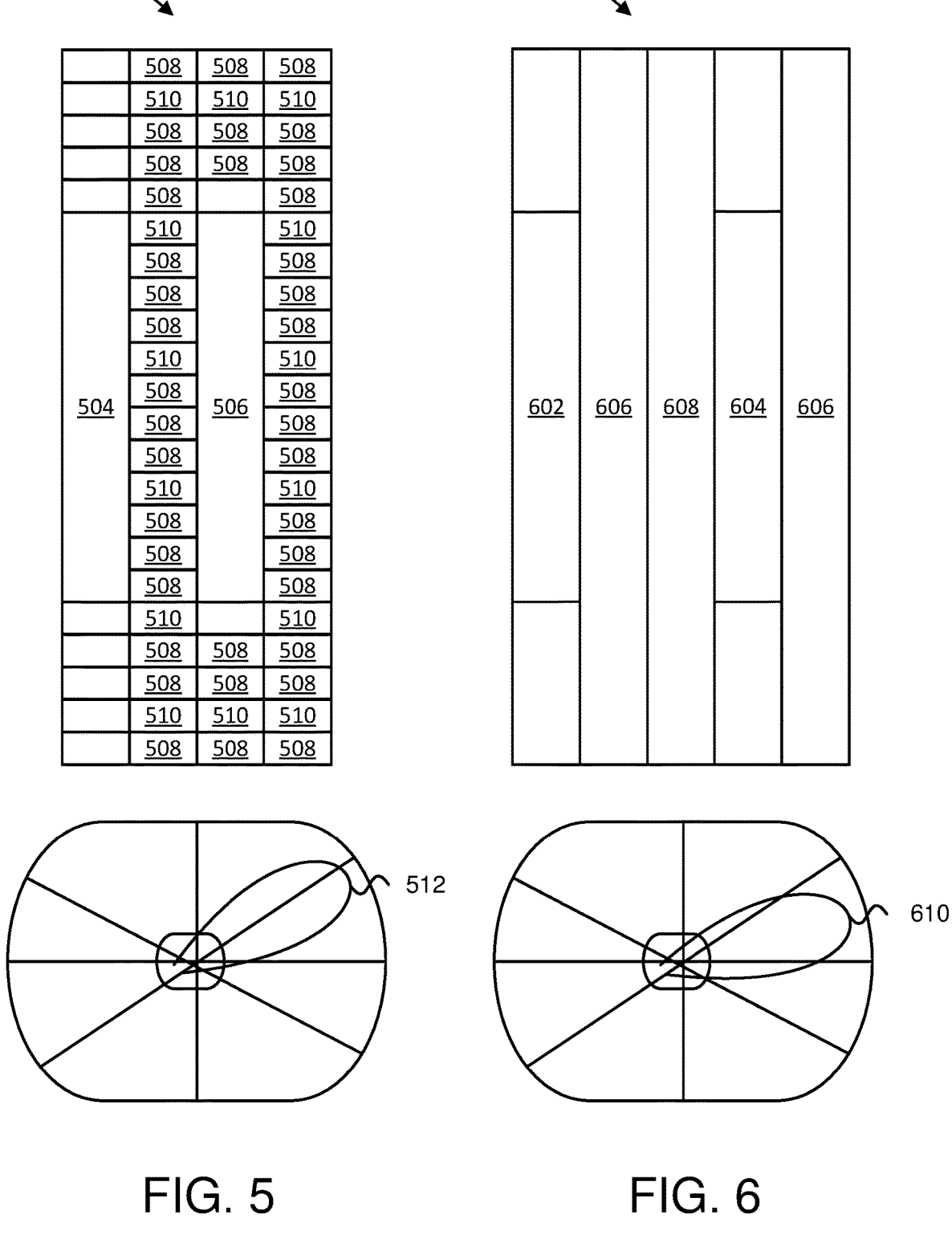
FIG. 5 is a diagram illustrating one embodiment of SSB sweeping with different waveforms for a first SS block for a first burst set.
FIG. 6 is a diagram illustrating one embodiment of SSB sweeping with different waveforms for a second SS block for the first burst set.

FIG. 5 is a diagram illustrating one embodiment of SSB sweeping with different waveforms for a first SS block 500 for a first burst set. The first symbol is used for primary synchronization signal 504, the second and fourth symbols are used for PBCH 508 and DMRS 510, while the third symbol is used for secondary synchronization symbol 506 multiplexed with the rest of PBCH 508 and DMRS 510 in the frequency domain. A first beam pattern 512 is used.

FIG. 6 is a diagram illustrating one embodiment of SSB sweeping with different waveforms for a second SS block 600 for the first burst set. The first symbol is used for primary synchronization signal 602, the fourth symbol is used for secondary synchronization symbol 604, the second and fifth symbols are used for PBCH 606, and the third symbol is used for DMRS 608 in the frequency domain. A second beam pattern 610 is used.

Figures 7, 8:
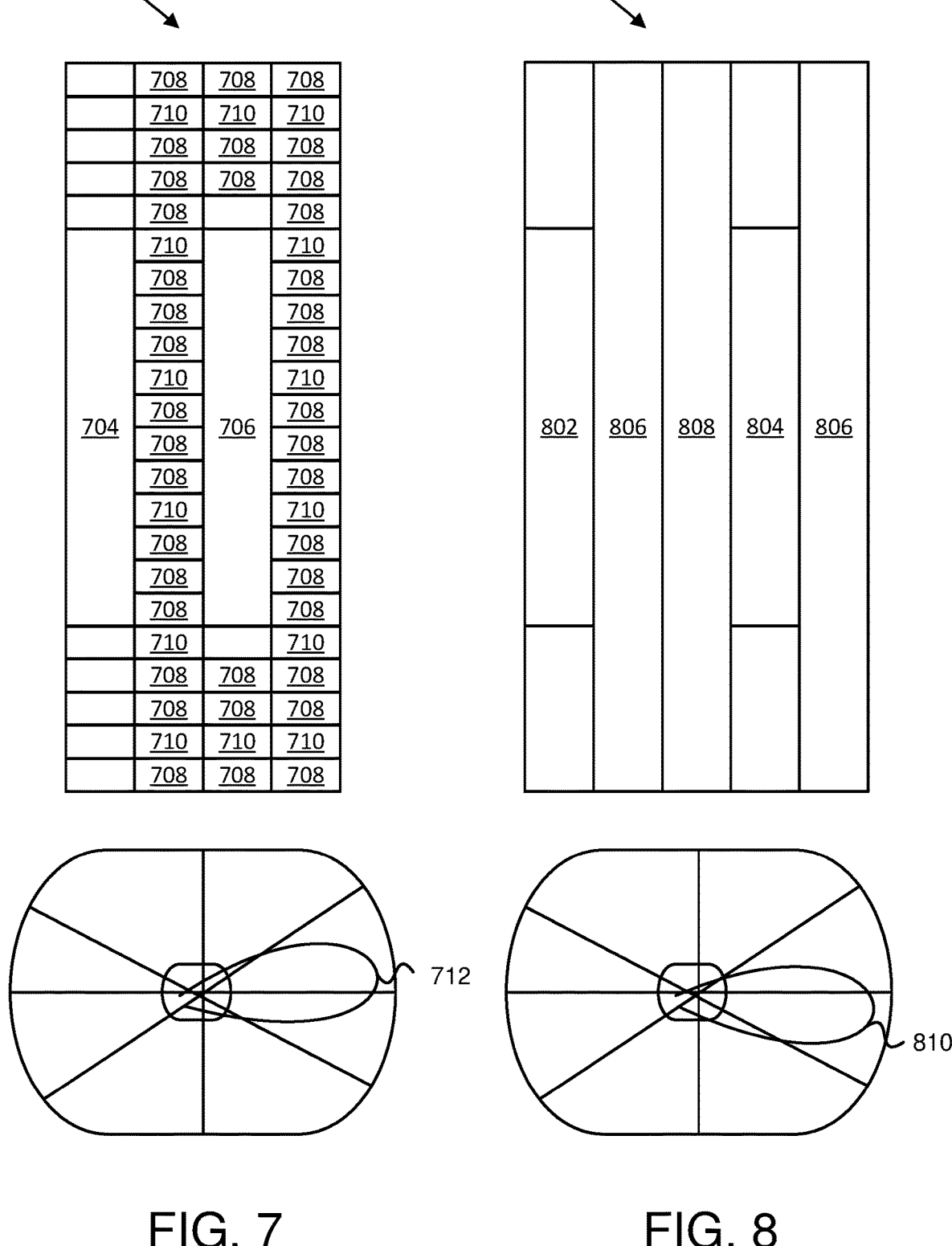
FIG. 7 is a diagram illustrating one embodiment of SSB sweeping with different waveforms for a third SS block for the first burst set.
FIG. 8 is a diagram illustrating one embodiment of SSB sweeping with different waveforms for a fourth SS block for the first burst set.

FIG. 7 is a diagram illustrating one embodiment of SSB sweeping with different waveforms for a third SS block 700 for the first burst set. The first symbol is used for primary synchronization signal 704, the second and fourth symbols are used for PBCH 708 and DMRS 710, while the third symbol is used for secondary synchronization symbol 706 multiplexed with the rest of PBCH 708 and DMRS 710 in the frequency domain. A third beam pattern 712 is used.

FIG. 8 is a diagram illustrating one embodiment of SSB sweeping with different waveforms for a fourth SS block 800 for the first burst set. The first symbol is used for primary synchronization signal 802, the fourth symbol is used for secondary synchronization symbol 804, the second and fifth symbols are used for PBCH 806, and the third symbol is used for DMRS 808 in the frequency domain. A fourth beam pattern 810 is used.

Figures 9, 10:
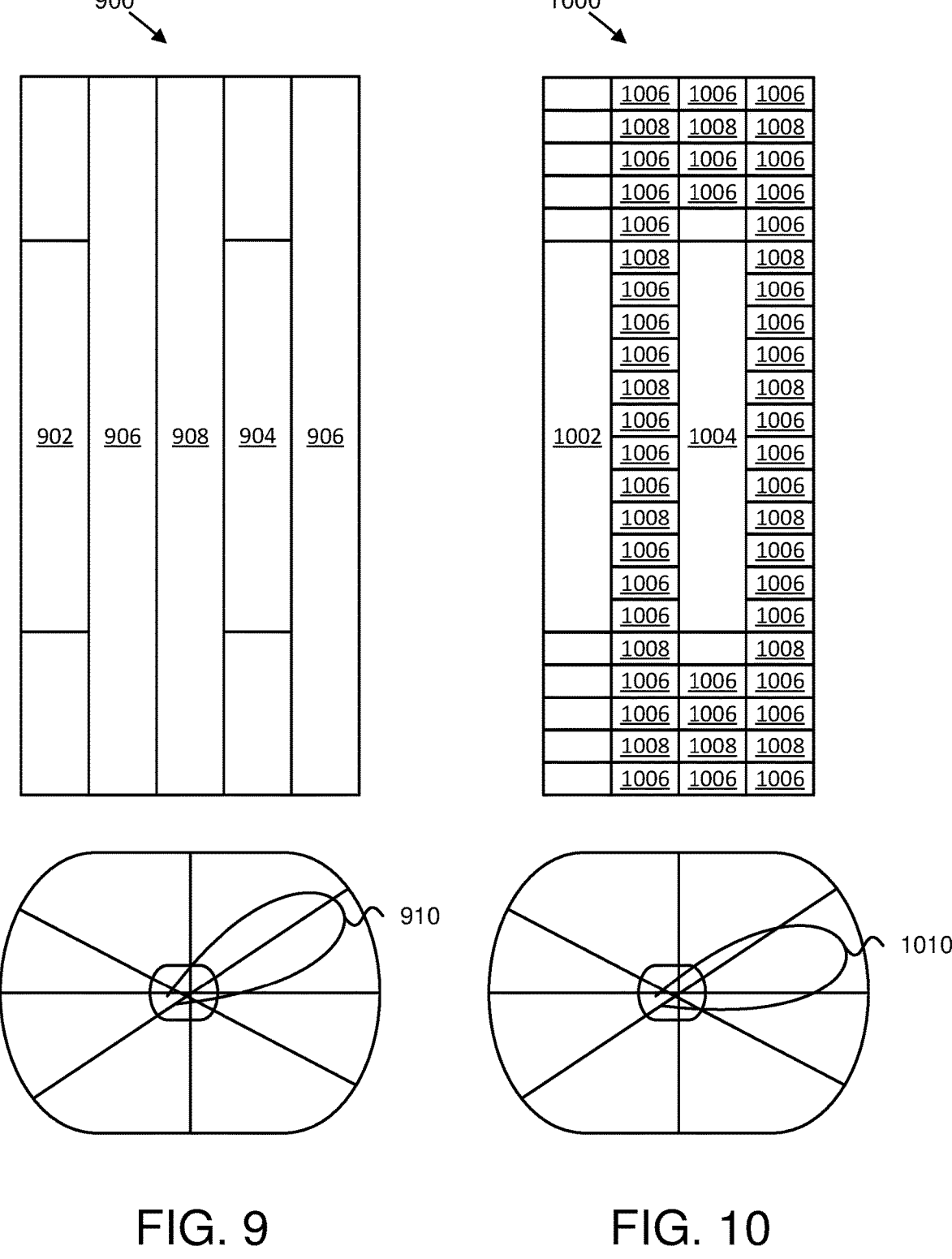
FIG. 9 is a diagram illustrating one embodiment of SSB sweeping with different waveforms for a first SS block for a second burst set.
FIG. 10 is a diagram illustrating one embodiment of SSB sweeping with different waveforms for a second SS block for the second burst set.

FIG. 9 is a diagram illustrating one embodiment of SSB sweeping with different waveforms for a first SS block 900 for a second burst set. The first symbol is used for primary synchronization signal 902, the fourth symbol is used for secondary synchronization symbol 904, the second and fifth symbols are used for PBCH 906, and the third symbol is used for DMRS 908 in the frequency domain. A first beam pattern 910 is used.

FIG. 10 is a diagram illustrating one embodiment of SSB sweeping with different waveforms for a second SS block 1000 for the second burst set. The first symbol is used for primary synchronization signal 1002, the second and fourth symbols are used for PBCH 1006 and DMRS 1008, while the third symbol is used for secondary synchronization symbol 1004 multiplexed with the rest of PBCH 1006 and DMRS 1008 in the frequency domain. A second beam pattern 1010 is used.

Figures 11, 12:
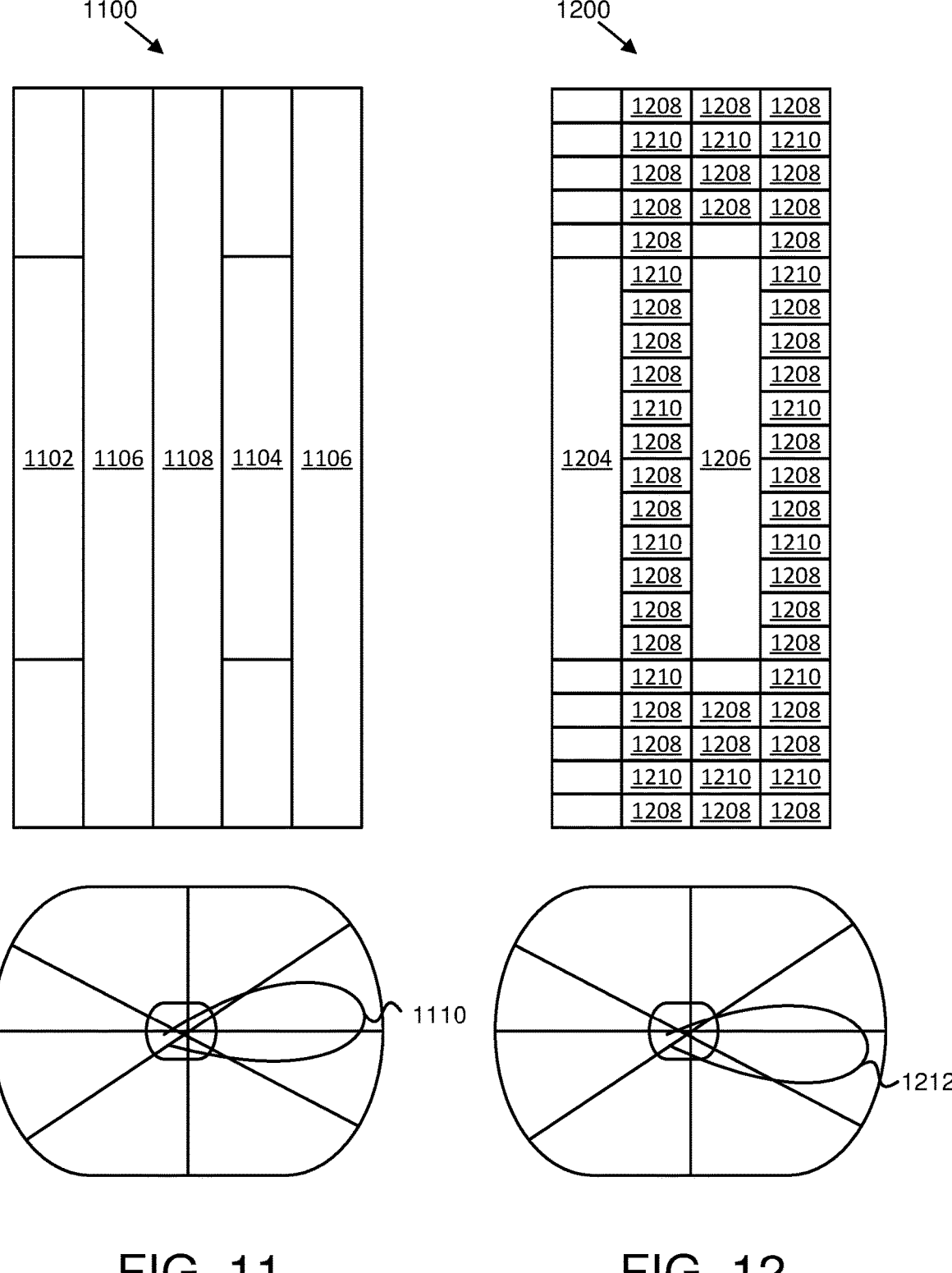
FIG. 11 is a diagram illustrating one embodiment of SSB sweeping with different waveforms for a third SS block for the second burst set.
FIG. 12 is a diagram illustrating one embodiment of SSB sweeping with different waveforms for a fourth SS block for the second burst set.

FIG. 11 is a diagram illustrating one embodiment of SSB sweeping with different waveforms for a third SS block 1100 for the second burst set. The first symbol is used for primary synchronization signal 1102, the fourth symbol is used for secondary synchronization symbol 1104, the second and fifth symbols are used for PBCH 1106, and the third symbol is used for DMRS 1108 in the frequency domain. A third beam pattern 1110 is used.

FIG. 12 is a diagram illustrating one embodiment of SSB sweeping with different waveforms for a fourth SS block 1200 for the second burst set. The first symbol is used for primary synchronization signal 1204, the second and fourth symbols are used for PBCH 1208 and DMRS 1210, while the third symbol is used for secondary synchronization symbol 1206 multiplexed with the rest of PBCH 1208 and DMRS 1210 in the frequency domain. A fourth beam pattern 1212 is used.

Figure 13:
FIG. 13 is a diagram illustrating one embodiment of a slot with mixed waveforms.
Figure 14:
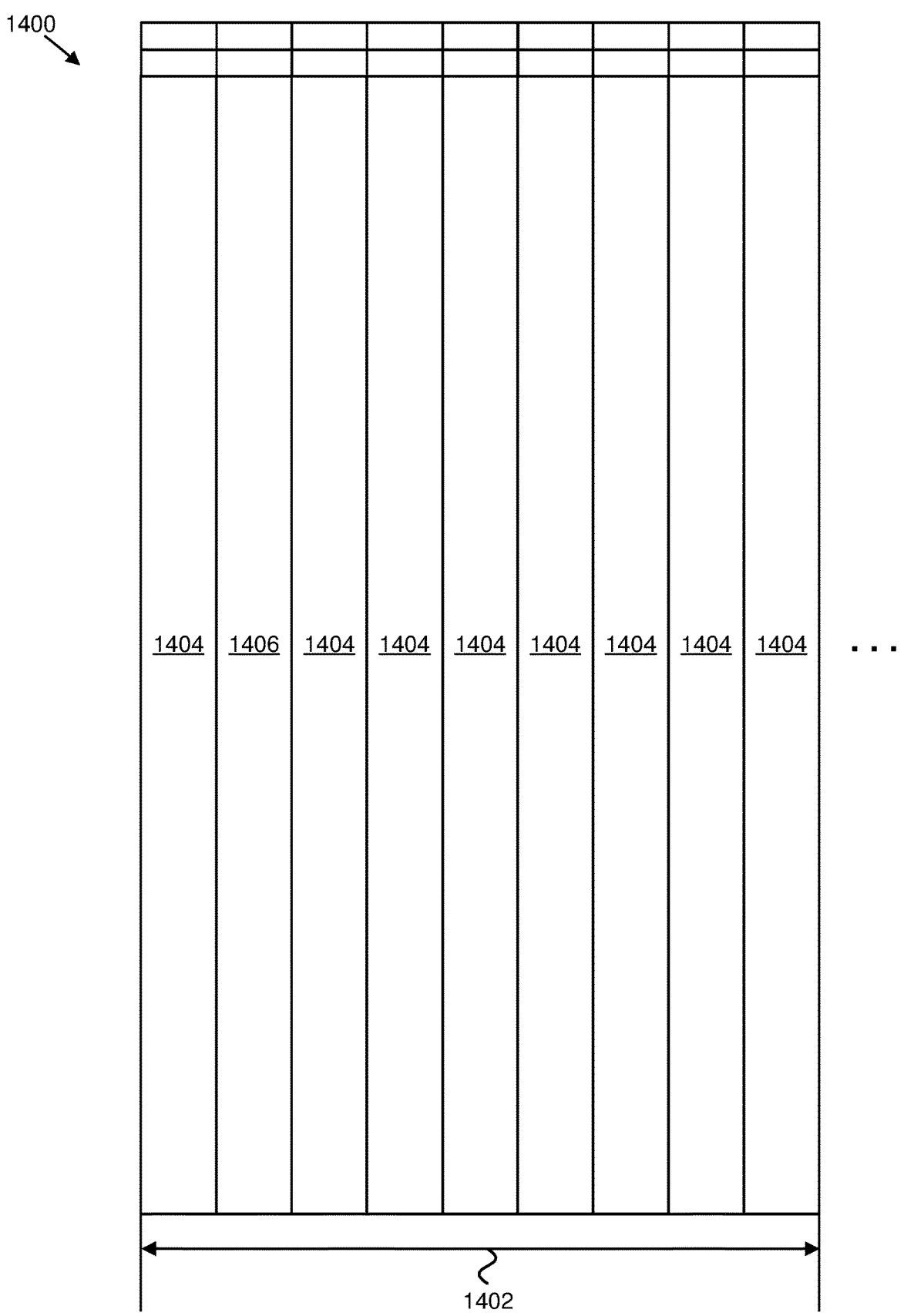
FIG. 14 is a diagram illustrating a continuation of the embodiment of FIG. 13.

In a third option, each DL, UL, or SL BWP in a carrier may be semi-statically configured for mixed waveform configuration in a slots, radio frame, or subframe. In one implementation, single carrier or multi-carrier waveforms are used for a DL data channel (e.g., PDSCH), while CP-OFDM is used for SSB, RMSI, and PDCCH as shown in FIGS. 13 and 14. This is motivated by the fact that these channels use low modulation order and occupy less bandwidth than the data channel and are less affected by RF non-linarites. In one implementation, in the symbols where SSB is present, PDSCH may use CP-OFDM with a low modulation order.

FIG. 13 is a diagram 1300 illustrating one embodiment of a slot with mixed waveforms. The diagram 1300 illustrates PSS 1304, SSS 1306, PBCH 1308, and DMRS 1310. A CP-OFDM PDCCH occupies a first time period 1312, a DFT-s-OFDM PDSCH occupies a second time period 1314, and a CP-OFDM SSB occupies a third time period 1316.

FIG. 14 is a diagram 1400 illustrating a continuation of the embodiment of FIG. 13. A DFT-s-OFDM PDSCH occupies a fourth time period 1402 that follows after the third time period 1316 of FIG. 13. The diagram 1400 includes PBCH 1404 and DMRS 1406.

Figure 15:
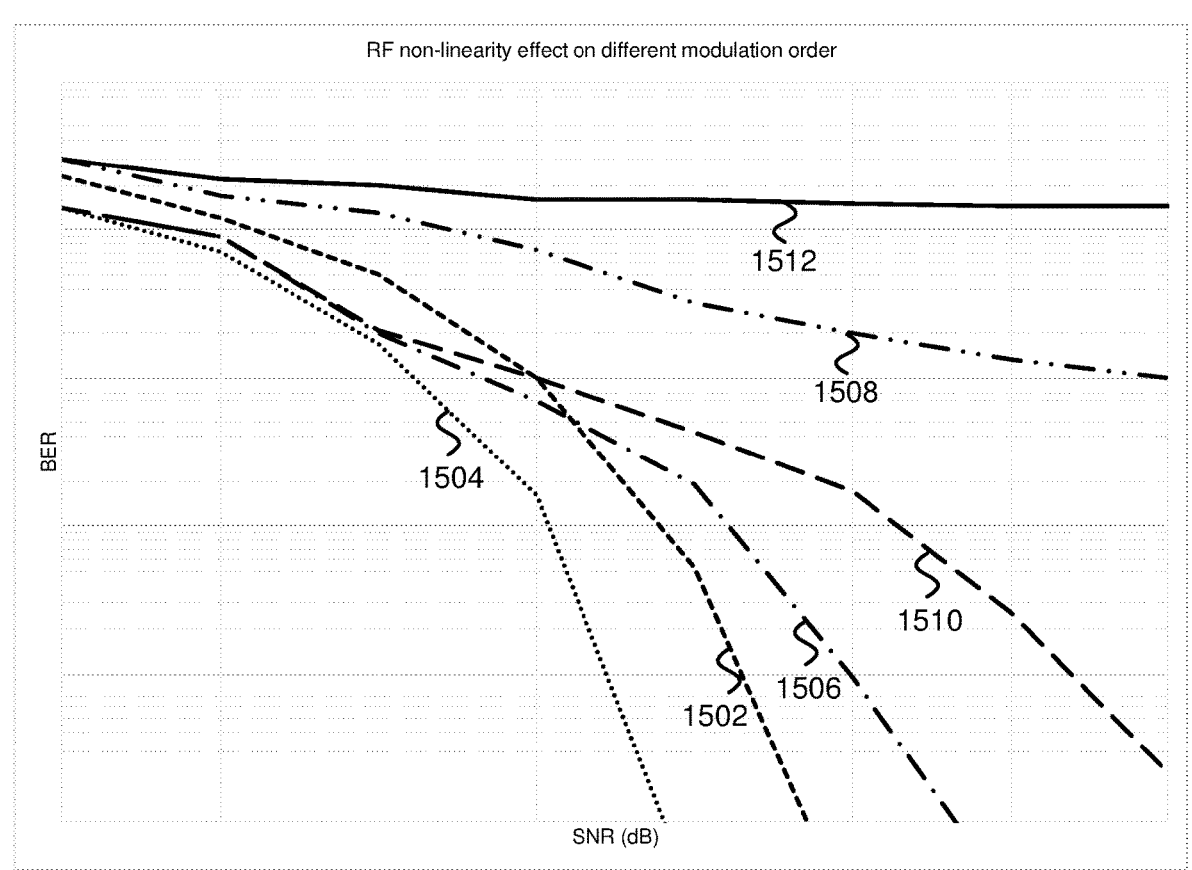
FIG. 15 is a graph illustrating one embodiment of RF non-linearity effect on different modulation orders.

FIG. 15 shows simulation results of CP-OFDM with and without RF non-linearity using a memory-less Rapp model and AWGN channel. As depicted in the figure, as the modulation order increases a performance degradation level increases.

FIG. 15 is a graph illustrating one embodiment of RF non-linearity effect on different modulation orders. A first curve 1502 corresponds to QPSK with RF impairments, a second curve 1504 corresponds to QPSK with no RF impairments, a third curve 1506 corresponds to 16 QAM with no RF impairments, a fourth curve 1508 corresponds to 16 QAM with RF impairments, a fifth curve 1510 corresponds to 64 QAM with no RF impedance, and a sixth curve 1512 corresponds to 64 QAM with RF impairments.

In some embodiments, PAPR of CP-OFDM may be modulation order-independent. Therefore, in such embodiments, to enhance PDCCH performance, higher AL (e.g., >16) may be applied, and a larger bandwidth for SSB may be used.

In a fourth option of the first embodiment, a BS may signal a selected waveform to a UE. In the fourth option, a bit field may be included in DCI to indicate the selected waveform for a PDSCH part of a dynamic waveform selection. In the fourth option, '0' may indicate a single carrier waveform and '1' may indicate a multi-carrier waveform and/or additional bits may indicate one or more type of single carrier or multi-carrier waveforms such as SC-QAM and/or SC-FDE. One or more bits may also indicate a slot or symbol offset for which a PDSCH transmission with a new waveform should start. Multiple waveform may coexist in the same slot, radio frame, and/or sub-frame, or may coexist in different BWPs in a carrier. In certain embodiments, if a UE receives DCI indicating a bit field about a type of waveform to be used for PDSCH in the same slot, the UE may be configured with flexible or guard symbols or slots if additional time for waveform switching is needed.

In various embodiments, a gNB may indicate a BWP of a new waveform along with a waveform indicator in DCI, may use a specific DCI format, or use a combination thereof. In such embodiments, a UE may perform BWP switching and waveform switching for anew active BWP indicated by the gNB in DCI. As may be appreciated, while certain embodiments may be described herein for downlink, they may also be applicable to uplink and/or sidelink.

In a fifth option, a gNB may select a suitable waveform (e.g., either single carrier or multi-carrier) for PDSCH based on one or more of a TA value of a UE, a UE measurement report (e.g., RSRP, RSRQ, and/or SINR), a UE measurement location, a UE power status (e.g., PH report), UE assistance information (e.g., DL transform precoding recommendation such as being based on a PL estimate), and/or a UE capability to support both single carrier and multi carrier waveforms.

In a sixth option, semi-static mapping of a waveform for PDSCH to DL BWP, PUSCH to UL BWP, or PSSCH to SL BWP may be signaled in an SIB or via RRC signaling so that a UE is aware of the waveform support for PDSCH in each BWP. In the sixth option, based on UE measurements, the UE may initiate a request to the gNB using UL control signaling for a BWP adaptation. In some embodiments, BWP information may include information indicating whether only one waveform is configured for that BWP, mixed waveforms are configured for that BWP, and/or multiple waveforms are configured for that BWP.

In one implementation of the sixth option, a UE may be configured with different SR configurations for different waveforms (e.g., single carrier or multi-carrier) and the UE may initiate its request to change a waveform for transmitting a specific SR. In another implementation of the sixth option, BSR transmission or MAC CE transmission from a UE may indicate the request for the sixth option. L1-PUCCH signaling may be used to indicate the request and/or a UE measurement report may also be used to indicate the request.

Based on a selection decision, the gNB may change the waveform for a specific UE on its current BWP. The indication to switch the WF for next slots may be sent in the current BWP with the current WF as shown in FIGS. 16 through 18 or reschedule the UE to a different BWP that is already configured with a suitable waveform as depicted in FIG. 19.

Figure 16:
FIG. 16 is a diagram illustrating one embodiment of DL waveform switching.

FIG. 16 is a diagram 1600 illustrating one embodiment of DL waveform switching. The first symbol is used for primary synchronization signal 1604, the second and fourth symbols are used for PBCH 1608 and DMRS 1610, while the third symbol is used for secondary synchronization symbol 1606 multiplexed with the rest of PBCH 1608 and DMRS 1610 in the frequency domain. The diagram 1600 illustrates an SSB using waveform CP-OFDM. A first indication 1612 and/or a second indication 1614 may be used to indicate to switch waveforms for the next slot.

Figure 17:
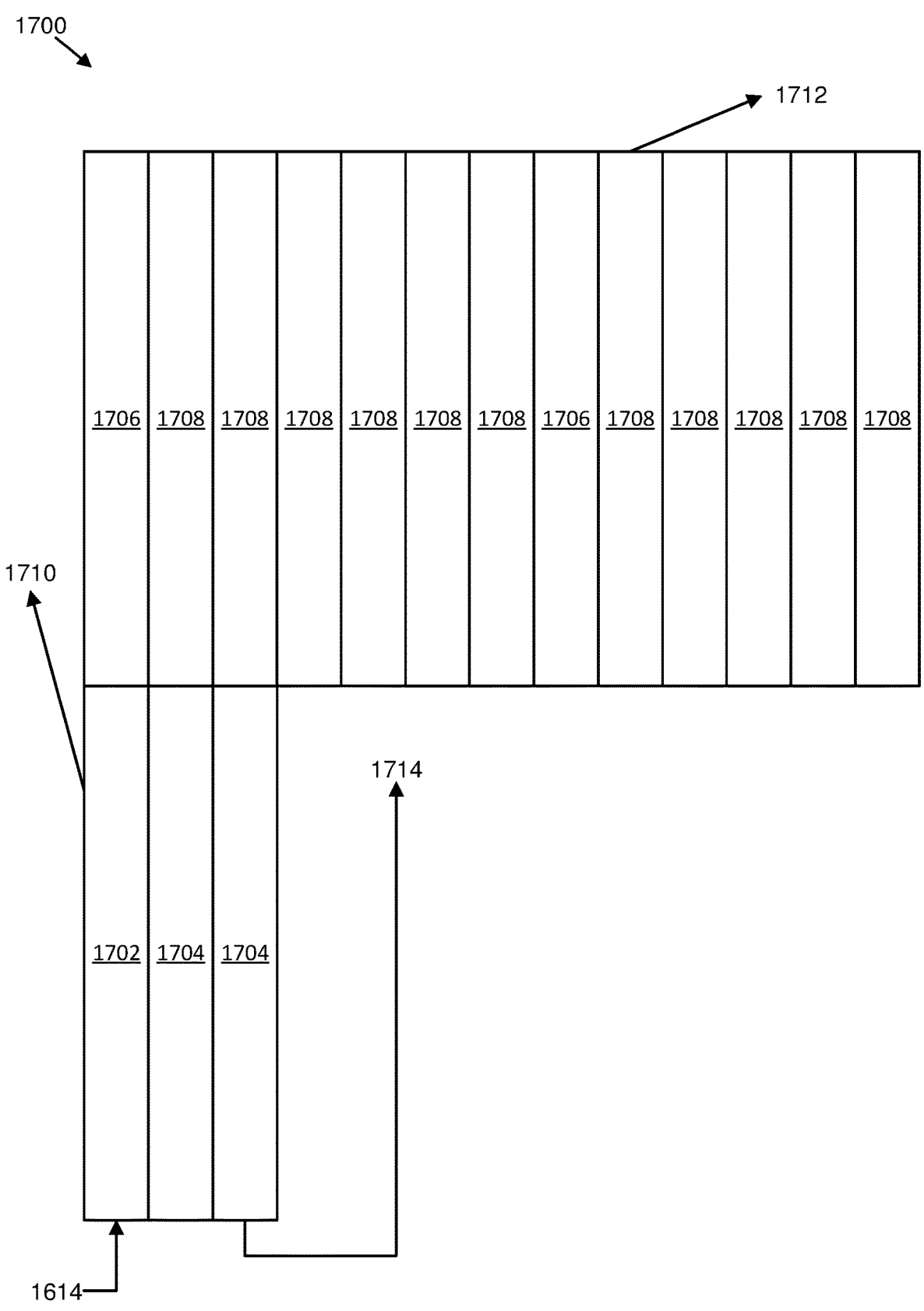
FIG. 17 is a diagram illustrating a continuation of the embodiment of FIG. 16.

FIG. 17 is a diagram 1700 illustrating a continuation of the embodiment of FIG. 16. The diagram 1700 illustrates DMRS 1702 and 1706, and PBCH 1704 and 1708 that transmit PDCCH 1710 and PDSCH 1712 using a DFT-s-OFDM waveform. The second indication 1614 may be used to indicate to switch waveforms from the prior slot to the current slot and/or a third indication 1714 may be used to indicate to switch waveforms for the next slot.

Figure 18:
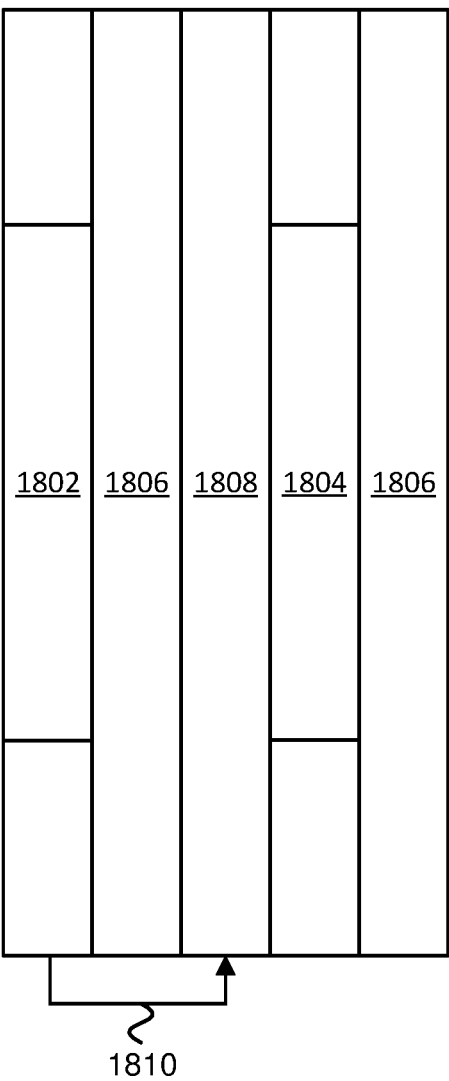
FIG. 18 is a diagram illustrating a continuation of the embodiment of FIGS. 16 and 17.
Figure 19:
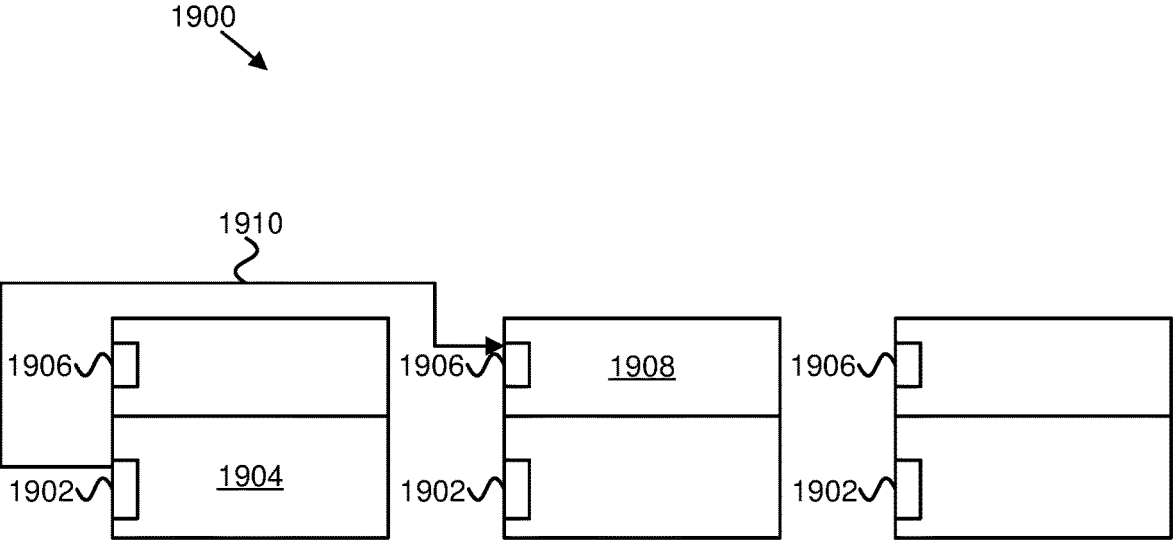
FIG. 19 is a diagram illustrating one embodiment of UE rescheduling.

FIG. 18 is a diagram 1800 illustrating a continuation of the embodiment of FIGS. 16 and 17. The first symbol is used for primary synchronization signal 1802, the fourth symbol is used for secondary synchronization symbol 1804, the second and fifth symbols are used for PBCH 1806, and the third symbol is used for DMRS 1808 in the frequency domain. A fourth indication 1810 may be used to indicate to switch waveforms for the next slot.

FIG. 19 is a diagram 1900 illustrating one embodiment of UE rescheduling. A first BWP 1902 may be used to transmit a CP-OFDM 1904 waveform, and a second BWP 1906 may be used to transmit a DFT-s-OFDM 1908 waveform. A signal 1910 may be used to transmit an indication to switch from the CP-OFDM 1904 waveform of the first BWP 1902 to the DFT-s-OFDM 1908 waveform of the second BWP 1906.

A second embodiment may be used for waveform selection and/or indication. In the second embodiment, a gNB selects initial waveforms to be used in different DL channels for an initial access based on a carrier frequency, a cell size, deployment and a use scenario.

In the second embodiment, a PSS sequence carries information about a waveform used for PBCH or a sequence may be coded with a waveform indicator. In such embodiments, the UE upon having decoded PSS or SSS, starts demodulating and decoding the PBCH with the corresponding waveform indication. The indication may also implicitly informs the UE about the location of DMRS and PBCH resources (e.g., waveform dependent pre-configuration).

In the second embodiment, a PBCH-DMRS or PBCH payload carries an indication of the waveform used for CORESET_type0 and SIBs. Based on a RACH TA, the gNB indicates the waveforms to be used by individual UEs for PUSCH Msg3 and the following DL and/or UL messages.

In the second embodiment, UEs with different RF front ends may observe different phase noise power, also a temperature variation of an RF model may lead to a time-variation of PN. Therefore, the UE needs to monitor PT-RS and report phase noise power to the gNB. Furthermore, other conventional parameters reported by the UE such as RSRP, CSI, battery status, and so forth may help the gNB in a waveform selection.

Based on the UE measurement reports, the gNB selects a suitable waveform for control and data of both UL and DL. The selection criteria may be based on the following parameters: PN, CSI, QoS requirements, UE power consumption (e.g., battery status), and/or location.

FIG. 20 illustrates a signaling procedure 2000 between a gNB and a UE for waveform switching. The signaling procedure 2000 includes communications transmitted between a gNB 2002 and a UE 2004. A first communication 2006 may be used to transmit PSS from the gNB 2002 to the UE 2004, in which the PSS sequence indicates a PBCH waveform. A second communication 2008 may be used to transmit SSS and/or PBCH from the gNB 2002 to the UE 2004. The PBCH DMRS may indicate CORESET_type0 and/or SIBs waveform. A third communication 2010 may be used to transmit SIBs from the gNB 2002 to the UE 2004. A fourth communication 2012 may be used to transmit RACH from the UE 2004 to the gNB 2002. The gNB 2002 may make 2014 an initial WF TA-based selection. A fifth communication 2016 may be used to transmit a RAR from the gNB 2002 to the UE 2004. A sixth communication 2018 may be used to transmit an attachment between the UE 2004 and the gNB 2002. A seventh communication 2020 may be used to transmit CSI-RS and/or PT-RS from the gNB 2002 to the UE 2004. The UE 2004 may make 2022 a PN measurement in which the UE monitors PT-RS, CSI-RS, report capabilities, PN, and/or a power status. An eighth communication 2024 may be used to transmit PUCCH (e.g., PN report, CQI) from the UE 2004 to the gNB 2002. The gNB 2002 may perform 2026 WF reselection. The selection criteria may be: PN, CSI, QoS requirements, UE power consumption (e.g., battery status), and/or location. A ninth communication 2028 may be used to transmit WF or BWP switching information from the gNB 2002 to the UE 2004.

A third embodiment may be used to perform Uu and/or sidelink waveform switching. In the third embodiment, a UE may be configured with either single or multi-carrier waveform in uplink, while SL supports only multi-carrier waveform. The third embodiment may be described with respect to UL BWP and SL BWP and may also be equally applicable for DL BWP and SL BWP.

In one implementation of the third embodiment, if UEs switch waveforms from single carrier UL BWP to multi-carrier SL BWP in a same carrier, there may be an additional switching delay required for a UE, and in an example, in configured sidelink slots, a UE may autonomously switch to a SL waveform.

In another implementation of the third embodiment, based on a priority of UL and/or SL traffic, a UE may deactivate either UL BWP or SL BWP if different waveforms are configured. Deactivating the SL BWP may be understood as disabling SL communication on a corresponding carrier and/or serving cell (e.g., a UE cannot transmit or receive SL communication on configured resource pools). The UE autonomously activates the SL BWP once the UL BWP and SL BWP support the same waveform. The UE autonomously switches to a configured UL BWP which has the same waveform as that of a SL BWP if the current active UL BWP's waveform is different from the waveform of the SL BWP. The UE could use L1 signaling to activate and/or deactivate a SL BWP and/or UL BWP. If there are multiple waveforms supported for SL communication by a UE, then the UE may autonomously switch a SL BWP to match an UL or DL waveform. The UE may be allowed to communicate on an active UL BWP with a waveform different from that of a SL BWP in slots that are reserved for NR UL, NR SL, or flexible symbols and which are at least a predefined time (e.g., x ms) ahead of the next slot configured for SL communication (e.g., there may be a gap of at least x ms between the NR UL operation and NR SL communication).

To allow sufficient time for switching a waveform, the UE may stop UL transmissions on an active UL BWP a predefined time (e.g., x ms) before a next SL slot (e.g., slot and/or subframe belonging to a SL resource pool). Upon having stopped UL transmissions (e.g., deactivated the UL BWP), the UE autonomously switches its waveform to that of SL BWP in order to be able to perform SL communication in the next SL slot and/or subframe. The predefined time used for switching the waveform may be derived based on RAN4 requirements with respect to BWP switching delay. Similarly, the UE stops SL communication (e.g., deactivates the SL BWP) a predefined time before the next UL slot in order to switch the waveform to the active UL BWP. For example, a switching delay may introduce UE behavior like dropping UL and/or SL transmission and may be based on a priority of UL and/or SL traffic, priority of HARQ-ACK and/or NACK in PUCCH in UL verses SL data transmission as configured for a UE or in a cell.

A fourth embodiment may include a PBCH-DMRS TDM and/or FDM design for DFT-s-OFDM.

In the fourth embodiment, a single carrier SSB design for downlink may be used. As shown in FIGS. 21 and 22 an SSB structure for a single carrier waveform such as DFT-s-OFDM may be designed with PBCH-DMRS in different options. In idle mode, a PBCH waveform may be indicated implicitly using a PSS sequence or its location.

In a first option illustrated in FIG. 21, a lowest PAPR design (e.g., which may depend on whether there are other signals and/or channels on other RBs of an SS and/or PBCH symbol) may require an extra symbol for DMRS to perform channel estimation. The extra symbol may be TDMed with other SSB symbols. Although this may lead to less spectral efficiency compared with CP-OFDM due to the extra DMRS symbol, PBCH may have a larger payload size and occupy entire subcarriers as compared with a multicarrier waveform, and SSS may have better frequency protection with a larger frequency guard band. In a second option illustrated in FIG. 22, DMRS may be split into two symbols multiplexed with PBCH and SSS in frequency domain, while few RBs will be used for DMRS. To guarantee sufficient channel estimation, DMRS may be mapped to the middle of the first PBCH symbol and to the edges of SSS symbol. This design may avoid an extra DMRS symbol; however, it may increase the PAPR of PBCH compared with TDMed DMRS.

FIG. 21 is a diagram 2100 illustrating one embodiment of SSB design for DFT-s-OFDM (e.g., option 1). The diagram 2100 illustrates PSS 2102, SSS 2104, PBCH 2106, and DMRS 2108. FIG. 22 is a diagram 2200 illustrating another embodiment of SSB design for DFT-s-OFDM (e.g., option 2). The diagram 2200 illustrates PSS 2202, SSS 2204, PBCH 2206, and DMRS 2208

In a fifth embodiment, PDDCH with prior DFT PT-RS may be used for a DFT-s-OFDM waveform.

In the fifth embodiment, a DFT-s-OFDM waveform for PDCCH may be used. In such an embodiment, a DL channel design may consider that a single carrier waveform may be related to PDCCH CORESETs and CCE mapping. For low PAPR transmission, a DMRS cannot be FDMed with data, accordingly, an extra DMRS symbol prior to or after PDCCH may be used.

FIGS. 23 through 27 show one embodiment of a PDCCH design.

Figures 23, 24:
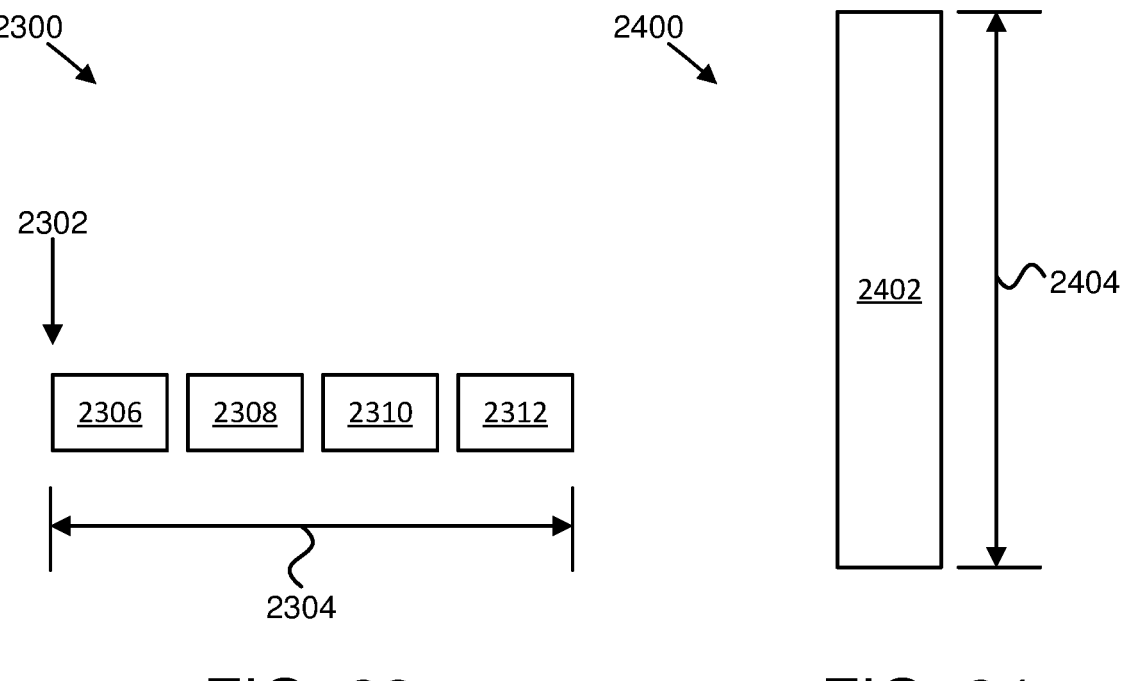
FIG. 23 is a diagram illustrating one embodiment of a PDCCH design.
FIG. 24 is a diagram illustrating a continuation of the PDCCH design of FIG. 23.

FIG. 23 is a diagram 2300 illustrating one embodiment of a PDCCH design. The diagram 2300 illustrates DCI 2302 received for a CORESET 2304. The CORESET 2304 includes a first CCE 2306, a second CCE 2308, a third CCE 2310, and a fourth CCE 2312.

FIG. 24 is a diagram 2400 illustrating a continuation of the PDCCH design of FIG. 23. A DFT may be performed on the CORESET 2304 to result in a CORESET 2402 that spans a frequency 2404.

FIG. 25 is a diagram 2500 illustrating a continuation of the PDCCH design of FIGS. 23 and 24. The diagram 2500 is illustrated over a time 2502. The diagram 2500 includes a CORESET 2506 (e.g., the CORESET 2402), a PDSCH_1 2510 (multiplexed PDSCH), PDSCH_1 2512, PDSCH_2 2514, DMRS 2516, DMRS 2518, and DMRS 2520.

Figures 26, 27:
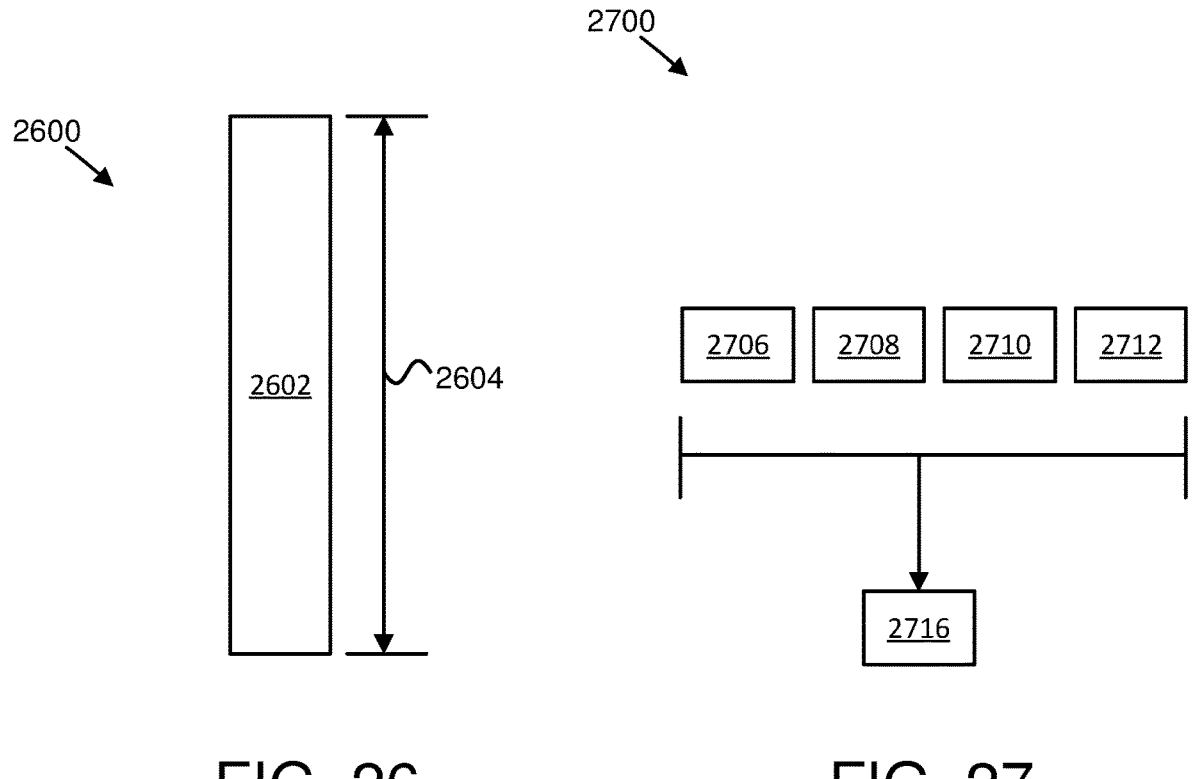
FIG. 26 is a diagram illustrating a continuation of the PDCCH design of FIGS. 23, 24, and 25.
FIG. 27 is a diagram illustrating a continuation of the PDCCH design of FIGS. 23, 24, 25, and 26.

FIG. 26 is a diagram 2600 illustrating a continuation of the PDCCH design of FIGS. 23, 24, and 25. A CORESET 2602 (e.g., CORESET 2506) spanning frequency 2604 may be extracted from the transmission of diagram 2500.

FIG. 27 is a diagram 2700 illustrating a continuation of the PDCCH design of FIGS. 23, 24, 25, and 26. An IDFT may be performed on the CORESET 2602 to result in a first CCE 2706, a second CCE 2708, a third CCE 2710, and a fourth CCE 2712. A blind search 2716 may be made on the first CCE 2706, the second CCE 2708, the third CCE 2710, and the fourth CCE 2712.

In some embodiments, a DFT operation may be applied on every configured CORESET. In order to enhance PDCCH performance, time domain PT-RS may be mapped to time domain REs prior to DFT. PT-RS may be located on time domain REs similar to PDCCH-DMRS frequency spacing used for CP-OFDM, such that DCI sizes to CCEs mapping remains unchanged. In one example, time-domain PTRS REs within a CCE may be grouped into bundles (e.g., of size 2 REs) and the bundles may be distributed and/or interleaved within the CCE. In another example, time-domain PTRS REs within a CCE may be grouped together and placed consecutively and/or contiguously (e.g., at or near the middle, start, and/or end of a CCE). High time density PT-RS tones may be used for PN compensation to enhance PDCCH decoding performance. The UE may start correcting a phase based on PT-RS along with channel estimation.

Figure 28:
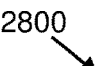
FIG. 28 is a diagram illustrating one embodiment of prior DFT PT-RS mapping for PDCCH.

FIG. 28 is a diagram 2800 illustrating one embodiment of prior DFT PT-RS mapping for PDCCH. The diagram 2800 is illustrated over time 2802 (e.g., OFDM symbols) and frequency 2804 (e.g., subcarriers). PDCCH 2806, PDCCH DMRS 2808, PDSCH 2810, PDSCH DMRS 2812, and PDSCH CSI-RS 2814 are illustrated using waveform CP-OFDM.

FIG. 29 is a diagram 2900 illustrating a continuation of the prior DFT PT-RS mapping for the PDCCH of FIG. 28. In diagram 2900, the OFDM symbols of diagram 2800 may be converted to CCEs. DCI 2902 is used to obtain a CORESET 2904. The CORESET 2904 includes a first CCE 2906, a second CCE 2908, a third CCE 2910, and a fourth CCE 2912 using a DFT-s-OFDM waveform.

FIG. 30 is a diagram 3000 illustrating a continuation of the prior DFT PT-RS mapping for the PDCCH of FIGS. 28 and 29. The diagram 3000 illustrates one embodiment of the first CCE 2906 of FIG. 29. The first CCE 2906 includes data 3002 and PT-RS 3004 following the same PDCCH-DMRS mapping as the diagram 2800.

FIG. 31 is a diagram 3100 illustrating a continuation of the prior DFT PT-RS mapping for the PDCCH of FIGS. 28, 29, and 30. A DTF may be performed on the CORESET 2904 to result in a CORESET 3102 over a frequency 3104.

In a sixth embodiment, PDCCH and/or PDSCH FDM in downlink for DFT-s-OFDM may be used.

Figure 32:
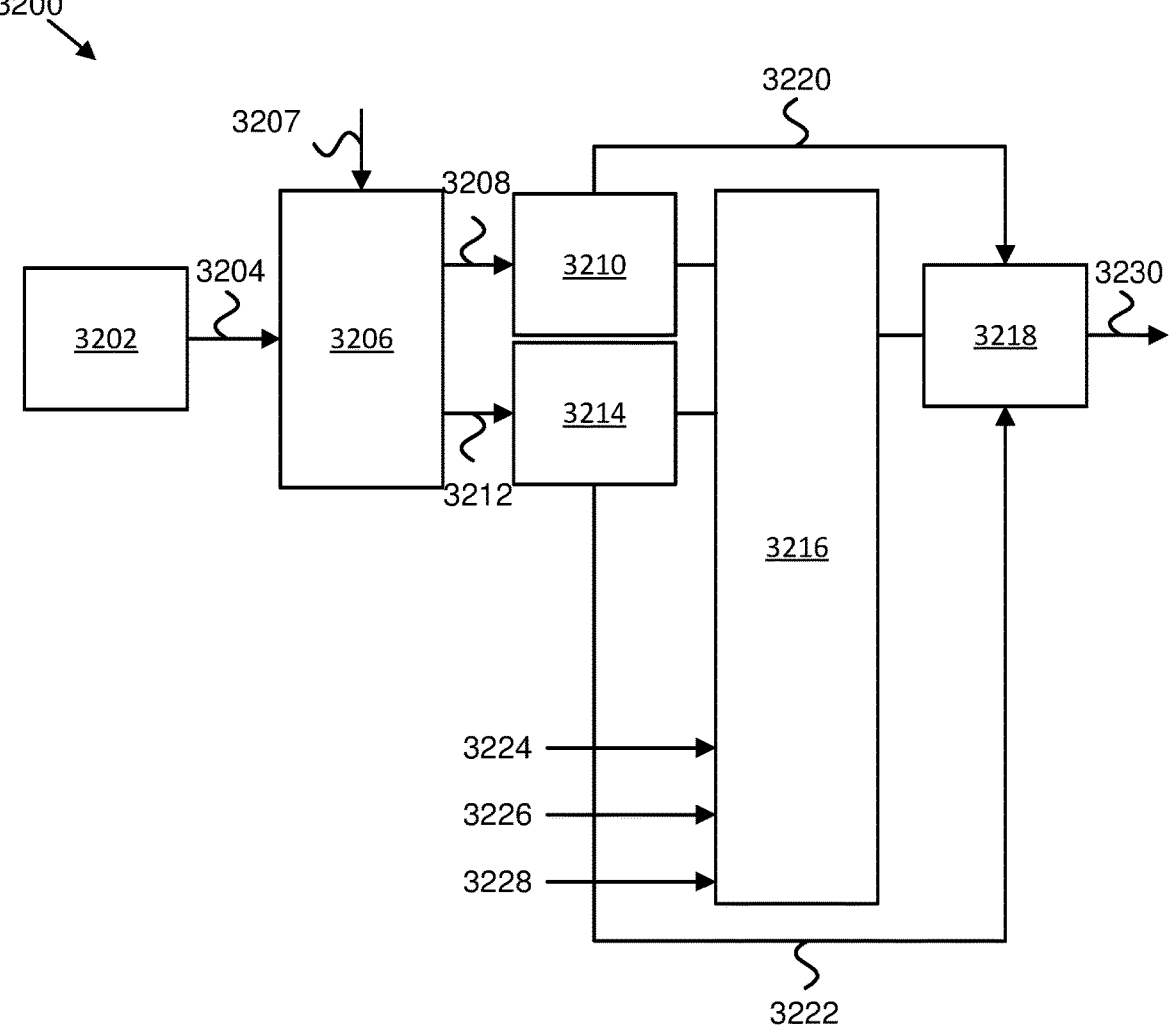
FIG. 32 is a diagram illustrating one embodiment of PDSCH based DFT-s-OFDM.
Figure 33:
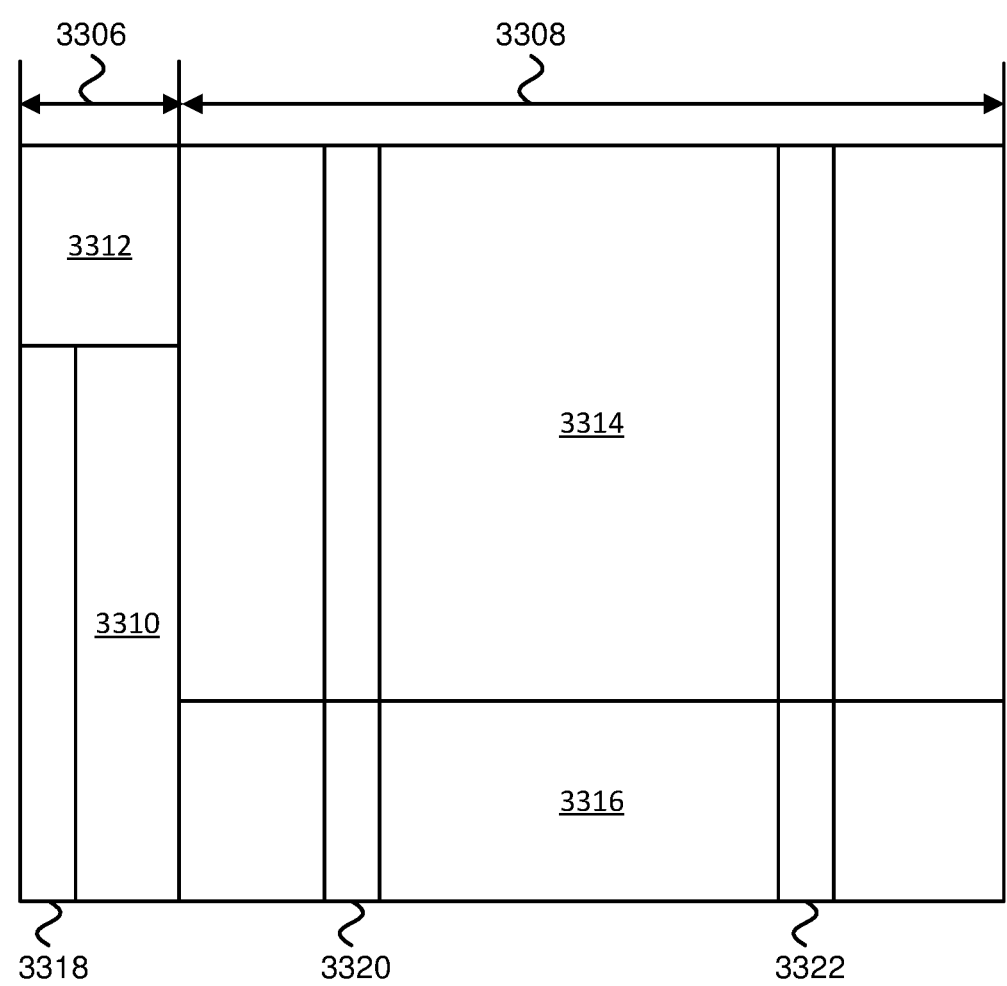
FIG. 33 is a diagram illustrating a continuation of the PDSCH based DFT-s-OFDM of FIG. 32.

The sixth embodiment deals with frequency domain multiplexing of PDCCH and PDSCH considering single carrier waveform design for downlink. CORESETs may span a smaller bandwidth than a carrier bandwidth enabling PDSCH to be multiplexed in the same symbols with PDCCH. To enable efficient PDSCH mapping in a time frequency grid, time domain REs of PDSCH may be split and grouped in different lengths to perform multiple DFT operations for every symbols in a slot and, in one example, the time domain symbols for which a CORESET is shared with PDSCH may have one DFT size for PDSCH compared to the rest of the symbols in the same slot where CORESET is not present and this operation is done before frame mapping as shown in FIGS. 32 and 33. The number and the size of these parts for PDSCH may depend on the size and location of PDCCH resources in time domain symbols. A number of PDSCH parts and a DFT size of each part may be signaled via DCI. In one implementation of the sixth embodiment, overlapping PDSCH and PDCCH in the same time domain symbol may be avoided with CORESETs spanning an entire time domain symbol.

FIG. 32 is a diagram 3200 illustrating one embodiment of PDSCH based DFT-s-OFDM. The diagram 3200 includes a module 3202 (e.g., modulator block where QAM and/or QPSK symbols are generated) that outputs data 3204 to an SPL 3206 (e.g., splitter). A coreset configuration 3207 is also provided to the SPL 3206. The SPL 3206 provides a first output 3208 to a first DFT 3210 and a second output 3212 to a second DFT 3214. A mapping 3216 receive output from the first DFT 3210 and the second DFT 3214. The mapping 3216 provides an output to an IDFT 3218. The IDFT 3218 receives first information 3220 from a first symbol loop (e.g., N1 symbols) and second information 3222 from a second symbol loop (e.g., N2 symbols). The mapping 3216 also receives other UEs PDSCH 3224, DMRS 3226, and PDCCH 3228. The IDFT 3218 output data 3230.

FIG. 33 is a diagram 3300 illustrating a continuation of the PDSCH based DFT-s-OFDM of FIG. 32 using the output data 3230. The diagram 3300 includes N1 symbols 3306 and N2 symbols 3308. The diagram 3300 includes a CORESET 3310, a PDSCH_1 3312 (multiplexed PDSCH), PDSCH_1 3314, PDSCH_2 3316, DMRS 3318, DMRS 3320, and DMRS 3322. FIG. 33 shows how the modulated symbols of PDSCH_1 are split, based on the functionality described in FIG. 32, into two parts PDSCH_1 3312 and PDSCH_1 3314 in a frequency and/or time grid. The sizes and the number of parts may be based on the CORESET 3310 (e.g., size and/or resources) which is given by the coreset configuration 3207 of FIG. 32.

Figure 34:
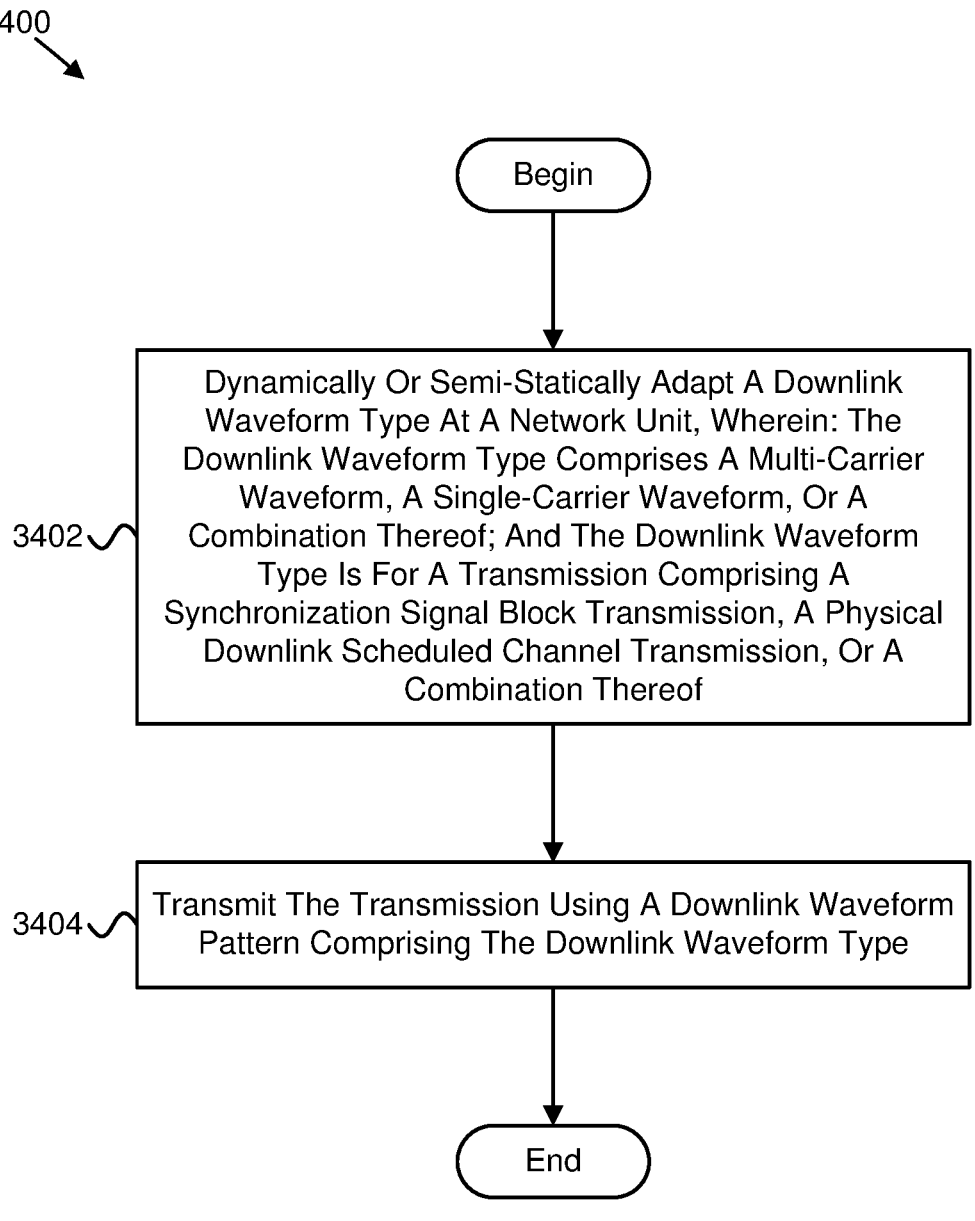
FIG. 34 is a flow chart diagram illustrating one embodiment of a method for transmission using an adapted downlink waveform type.

FIG. 34 is a flow chart diagram illustrating one embodiment of a method 3400 for transmission using an adapted downlink waveform type. In some embodiments, the method 3400 is performed by an apparatus, such as the network unit 104. In certain embodiments, the method 3400 may be performed by a processor executing program code, for example, a microcontroller, a microprocessor, a CPU, a GPU, an auxiliary processing unit, a FPGA, or the like.

In various embodiments, the method 3400 includes dynamically or semi-statically adapting 3402 a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof. In some embodiments, the method 3400 includes transmitting 3404 the transmission using a downlink waveform pattern comprising the downlink waveform type.

In certain embodiments, the downlink waveform pattern is used for synchronization signal block sweeping so that different synchronization signal block transmissions use different waveforms, and the downlink waveform pattern comprises changeable waveform patterns for each synchronization signal burst set of a plurality of synchronization signal burst sets. In some embodiments, the method 3400 further comprises indicating to a user equipment the downlink waveform type. In various embodiments, the method 3400 further comprises transmitting a synchronization signal block to a user equipment to indicate the downlink waveform pattern to the user equipment.

In one embodiment, the method 3400 further comprises transmitting a primary synchronization signal sequence to a user equipment to indicate the downlink waveform type to the user equipment, wherein the downlink waveform type comprising a waveform of a physical broadcast channel. In certain embodiments, the method 3400 further comprises transmitting a physical broadcast channel payload or a physical broadcast channel demodulation reference signal to a user equipment to indicate the downlink waveform type to the user equipment, wherein the downlink waveform type comprising a waveform of system information blocks and a common resource set. In some embodiments, the method 3400 further comprising transmitting a random access response message during an initial access procedure to a user equipment to indicate the downlink waveform type to the user equipment.

In various embodiments, the method 3400 further comprises transmitting downlink control information or a medium access control control element to a user equipment to indicate the downlink waveform type to the user equipment, wherein the downlink waveform type comprises a waveform for a data channel.

FIG. 35 is a flow chart diagram illustrating another embodiment of a method 3500 for transmission. In some embodiments, the method 3500 is performed by an apparatus, such as the remote unit 102. In certain embodiments, the method 3500 may be performed by a processor executing program code, for example, a microcontroller, a microprocessor, a CPU, a GPU, an auxiliary processing unit, a FPGA, or the like.

In various embodiments, the method 3500 includes transmitting 3502 a measurement report to a network unit, wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

FIG. 36 is a flow chart diagram illustrating another embodiment of a method 3600 for transmission. In some embodiments, the method 3600 is performed by an apparatus, such as the remote unit 102. In certain embodiments, the method 3600 may be performed by a processor executing program code, for example, a microcontroller, a microprocessor, a CPU, a GPU, an auxiliary processing unit, a FPGA, or the like.

In various embodiments, the method 3600 includes transmitting 3602 uplink control signaling to a network unit, wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In certain embodiments, the method 3600 further comprises transmitting a scheduling request to the network unit, wherein the scheduling request comprises information indicating a requested waveform for the downlink waveform type. In some embodiments, the method 3600 further comprises transmitting indicating a medium access control control element to the network unit, wherein the medium access control control element comprises information indicating a requested waveform for the downlink waveform type.

Figure 37:
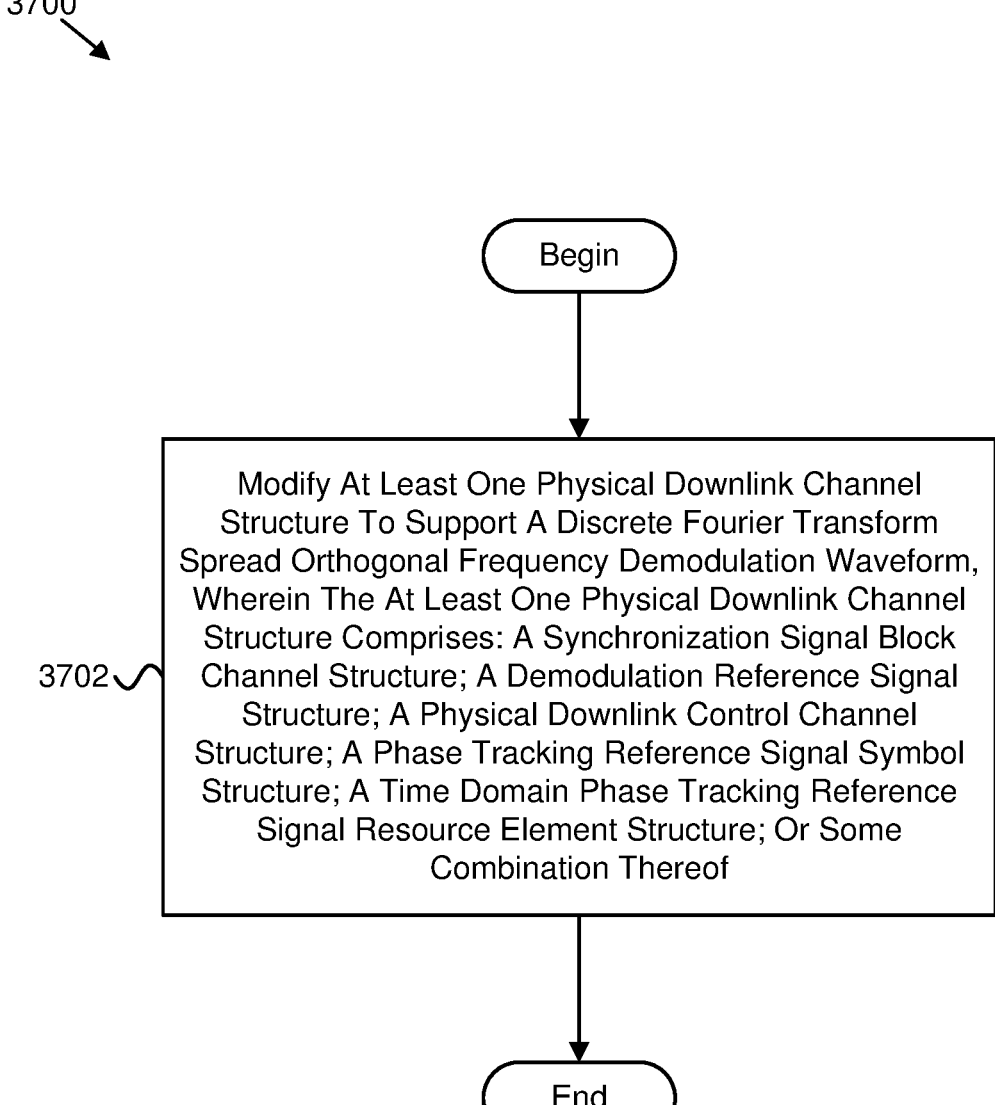
FIG. 37 is a flow chart diagram illustrating one embodiment of a method for modifying a channel structure.

FIG. 37 is a flow chart diagram illustrating one embodiment of a method 3700 for modifying a channel structure. In some embodiments, the method 3700 is performed by an apparatus, such as the remote unit 102 and/or the network unit 104. In certain embodiments, the method 3700 may be performed by a processor executing program code, for example, a microcontroller, a microprocessor, a CPU, a GPU, an auxiliary processing unit, a FPGA, or the like.

In various embodiments, the method 3700 includes modifying 3702 at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

In certain embodiments, the synchronization signal block channel structure is modified so that demodulation reference symbols are time division multiplexed with a physical broadcast channel before or after physical broadcast channel symbols for channel estimation, and physical broadcast channel symbols contain only physical broadcast channel resource elements. In some embodiments, the demodulation reference signal structure comprises a demodulation reference signal split into two symbols multiplexed with a physical broadcast channel and a secondary synchronization signal in a frequency domain so that each of the two symbols is in a different physical broadcast channel resource block group and a discrete Fourier transform is performed on each physical broadcast channel resource block group. In various embodiments, the physical downlink control channel structure is modified so that demodulation reference signal symbols are time division multiplexed with physical downlink control channel resource elements.

In one embodiment, the phase tracking reference signal symbol structure comprises phase tracking reference signal symbols being inserted in a time domain prior to a discrete Fourier transform. In certain embodiments, the time domain phase tracking reference signal resource element structure comprises time domain phase tracking reference signal resource elements within a control channel element grouped in bundles and the bundles are interleaved within the control channel element. In some embodiments, the time domain phase tracking reference signal resource element structure comprises time domain phase tracking reference signal resource elements within a control channel element grouped together and placed contiguously at or near a middle of the control channel element. In various embodiments, the time domain phase tracking reference signal resource element structure comprises time domain phase tracking reference signal resource elements within a control channel element grouped together and placed contiguously at or near a beginning or end of the control channel element.

In one embodiment, a method comprises: dynamically or semi-statically adapting a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof; and transmitting the transmission using a downlink waveform pattern comprising the downlink waveform type.

In certain embodiments, the downlink waveform pattern is used for synchronization signal block sweeping so that different synchronization signal block transmissions use different waveforms, and the downlink waveform pattern comprises changeable waveform patterns for each synchronization signal burst set of a plurality of synchronization signal burst sets.

In some embodiments, the method further comprises indicating to a user equipment the downlink waveform type.

In various embodiments, the method further comprises transmitting a synchronization signal block to a user equipment to indicate the downlink waveform pattern to the user equipment.

In one embodiment, the method further comprises transmitting a primary synchronization signal sequence to a user equipment to indicate the downlink waveform type to the user equipment, wherein the downlink waveform type comprising a waveform of a physical broadcast channel.

In certain embodiments, the method further comprises transmitting a physical broadcast channel payload or a physical broadcast channel demodulation reference signal to a user equipment to indicate the downlink waveform type to the user equipment, wherein the downlink waveform type comprising a waveform of system information blocks and a common resource set.

In some embodiments, the method further comprises transmitting a random access response message during an initial access procedure to a user equipment to indicate the downlink waveform type to the user equipment.

In various embodiments, the method further comprises transmitting downlink control information or a medium access control control element to a user equipment to indicate the downlink waveform type to the user equipment, wherein the downlink waveform type comprises a waveform for a data channel.

In one embodiment, an apparatus comprises: a processor that dynamically or semi-statically adapts a downlink waveform type at a network unit, wherein: the downlink waveform type comprises a multi-carrier waveform, a single-carrier waveform, or a combination thereof; and the downlink waveform type is for a transmission comprising a synchronization signal block transmission, a physical downlink scheduled channel transmission, or a combination thereof; and a transmitter that transmits the transmission using a downlink waveform pattern comprising the downlink waveform type.

In certain embodiments, the downlink waveform pattern is used for synchronization signal block sweeping so that different synchronization signal block transmissions use different waveforms, and the downlink waveform pattern comprises changeable waveform patterns for each synchronization signal burst set of a plurality of synchronization signal burst sets.

In some embodiments, the transmitter transmits information that indicates to a user equipment the downlink waveform type.

In various embodiments, the transmitter transmits a synchronization signal block to a user equipment to indicate the downlink waveform pattern to the user equipment.

In one embodiment, the transmitter transmits a primary synchronization signal sequence to a user equipment to indicate the downlink waveform type to the user equipment, and the downlink waveform type comprises a waveform of a physical broadcast channel.

In certain embodiments, the transmitter transmits a physical broadcast channel payload or a physical broadcast channel demodulation reference signal to a user equipment to indicate the downlink waveform type to the user equipment, and the downlink waveform type comprises a waveform of system information blocks and a common resource set.

In some embodiments, the transmitter transmits a random access response message during an initial access procedure to a user equipment to indicate the downlink waveform type to the user equipment.

In various embodiments, the transmitter transmits downlink control information or a medium access control control element to a user equipment to indicate the downlink waveform type to the user equipment, and the downlink waveform type comprises a waveform for a data channel.

In one embodiment, a method comprises: transmitting a measurement report to a network unit, wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In one embodiment, an apparatus comprises: a transmitter that transmits a measurement report to a network unit, wherein: the measurement report comprises information indicating a phase noise power; the phase noise power is used by the network unit for selecting a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In one embodiment, a method comprises: transmitting uplink control signaling to a network unit, wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In certain embodiments, the method further comprises transmitting a scheduling request to the network unit, wherein the scheduling request comprises information indicating a requested waveform for the downlink waveform type.

In some embodiments, the method further comprises transmitting indicating a medium access control control element to the network unit, wherein the medium access control control element comprises information indicating a requested waveform for the downlink waveform type.

In one embodiment, an apparatus comprises: a transmitter that transmits uplink control signaling to a network unit, wherein: the uplink control signaling is used to request a change in a downlink waveform type; the downlink waveform type comprises a multi-carrier waveform, a single-carrier waveform, or a combination thereof; and the downlink waveform type is for a transmission from the network unit comprising a synchronization signal block transmission, a physical downlink scheduled channel transmission, or a combination thereof.

In certain embodiments, the transmitter transmits a scheduling request to the network unit, and the scheduling request comprises information indicating a requested waveform for the downlink waveform type.

In some embodiments, the transmitter transmits indicating a medium access control control element to the network unit, and the medium access control control element comprises information indicating a requested waveform for the downlink waveform type.

In one embodiment, a method comprises: modifying at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

In certain embodiments, the synchronization signal block channel structure is modified so that demodulation reference symbols are time division multiplexed with a physical broadcast channel before or after physical broadcast channel symbols for channel estimation, and physical broadcast channel symbols contain only physical broadcast channel resource elements.

In some embodiments, the demodulation reference signal structure comprises a demodulation reference signal split into two symbols multiplexed with a physical broadcast channel and a secondary synchronization signal in a frequency domain so that each of the two symbols is in a different physical broadcast channel resource block group and a discrete Fourier transform is performed on each physical broadcast channel resource block group.

In various embodiments, the physical downlink control channel structure is modified so that demodulation reference signal symbols are time division multiplexed with physical downlink control channel resource elements.

In one embodiment, the phase tracking reference signal symbol structure comprises phase tracking reference signal symbols being inserted in a time domain prior to a discrete Fourier transform.

In certain embodiments, the time domain phase tracking reference signal resource element structure comprises time domain phase tracking reference signal resource elements within a control channel element grouped in bundles and the bundles are interleaved within the control channel element.

In some embodiments, the time domain phase tracking reference signal resource element structure comprises time domain phase tracking reference signal resource elements within a control channel element grouped together and placed contiguously at or near a middle of the control channel element.

In various embodiments, the time domain phase tracking reference signal resource element structure comprises time domain phase tracking reference signal resource elements within a control channel element grouped together and placed contiguously at or near a beginning or end of the control channel element.

In one embodiment, an apparatus comprises: a processor that modifies at least one physical downlink channel structure to support a discrete Fourier transform spread orthogonal frequency demodulation waveform, wherein the at least one physical downlink channel structure comprises: a synchronization signal block channel structure; a demodulation reference signal structure; a physical downlink control channel structure; a phase tracking reference signal symbol structure; a time domain phase tracking reference signal resource element structure; or some combination thereof.

In certain embodiments, the synchronization signal block channel structure is modified so that demodulation reference symbols are time division multiplexed with a physical broadcast channel before or after physical broadcast channel symbols for channel estimation, and physical broadcast channel symbols contain only physical broadcast channel resource elements.

In some embodiments, the demodulation reference signal structure comprises a demodulation reference signal split into two symbols multiplexed with a physical broadcast channel and a secondary synchronization signal in a frequency domain so that each of the two symbols is in a different physical broadcast channel resource block group and a discrete Fourier transform is performed on each physical broadcast channel resource block group.

In various embodiments, the physical downlink control channel structure is modified so that demodulation reference signal symbols are time division multiplexed with physical downlink control channel resource elements.

In one embodiment, the phase tracking reference signal symbol structure comprises phase tracking reference signal symbols being inserted in a time domain prior to a discrete Fourier transform.

In certain embodiments, the time domain phase tracking reference signal resource element structure comprises time domain phase tracking reference signal resource elements within a control channel element grouped in bundles and the bundles are interleaved within the control channel element.

In some embodiments, the time domain phase tracking reference signal resource element structure comprises time domain phase tracking reference signal resource elements within a control channel element grouped together and placed contiguously at or near a middle of the control channel element.

In various embodiments, the time domain phase tracking reference signal resource element structure comprises time domain phase tracking reference signal resource elements within a control channel element grouped together and placed contiguously at or near a beginning or end of the control channel element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a base station, the method comprising:
obtaining capability information that indicates that single-carrier and multi-carrier waveforms are supported by a user equipment (UE);
dynamically or semi-statically adapting a waveform type based at least in part on the capability information, a phase noise power, a UE measurement location, and a UE power status, wherein the waveform type comprises a multi-carrier waveform, a single-carrier waveform, or a combination thereof; and
transmitting a transmission using a waveform pattern according to the waveform type, wherein the transmission comprises a synchronization signal block (SSB) transmission, a physical downlink scheduled channel (PDSCH) transmission, or a combination thereof.

2. The method of claim 1, wherein the waveform pattern is used for SSB sweeping so that different SSB transmissions use different waveforms, and a downlink waveform pattern comprises changeable waveform patterns for each synchronization signal burst set of a plurality of synchronization signal burst sets.

3. The method of claim 1, further comprising indicating to the UE the waveform type.

4. The method of claim 1, further comprising transmitting a SSB to the UE to indicate a downlink waveform pattern to the UE.

5. The method of claim 1, further comprising transmitting a primary synchronization signal (PSS) sequence to the UE to indicate the waveform type to the UE, wherein the waveform type comprising a waveform of a physical broadcast channel (PBCH).

6. The method of claim 1, further comprising transmitting a physical broadcast channel (PBCH) payload or a PBCH demodulation reference signal (DMRS) to the UE to indicate the waveform type to the UE, wherein the waveform type comprising a waveform of system information blocks (SIBs) and a common resource set.

7. The method of claim 1, further comprising transmitting a random access response (RAR) message during an initial access procedure to the UE to indicate the waveform type to the UE.

8. The method of claim 1, further comprising transmitting downlink control information (DCI) or a medium access control-control element (MAC-CE) to the UE to indicate the waveform type to the UE, wherein the waveform type comprises a waveform for a data channel.

9. A method at a user equipment (UE), the method comprising:

transmitting uplink control signaling to a base station, wherein:

the uplink control signaling is used to request a change in a waveform type; and the waveform type comprises a multi-carrier waveform, a single-carrier waveform, or a combination thereof; and receiving a transmission using a waveform pattern according to the waveform type, wherein the waveform pattern is determined based on capability information that indicates that single-carrier and multi-carrier waveforms are supported by the UE, a phase noise power, a UE measurement location, and a UE power status, wherein the transmission comprises a synchronization signal block (SSB) transmission, a physical downlink scheduled channel (PDSCH) transmission, or a combination thereof.

10. The method of claim 9, further comprising transmitting a scheduling request to the base station, wherein the scheduling request comprises information indicating a requested waveform for the waveform type.

11. The method of claim 9, further comprising transmitting a medium access control-control element (MAC-CE) to the base station, wherein the MAC-CE comprises information indicating a requested waveform for the waveform type.

12. A method at a base station, the method comprising:

obtaining capability information that indicates that single-carrier and multi-carrier waveforms are supported by a user equipment (UE); and modifying at least one physical downlink channel structure to support a discrete Fourier transform spread orthogonal frequency demodulation waveform based at least in part on the capability information, a phase noise power, a UE measurement location, and a UE power status, wherein the at least one physical downlink channel structure comprises:

a synchronization signal block (SSB) channel structure;

a demodulation reference signal (DMRS) structure;

a physical downlink control channel (PDCCH) structure;

a phase tracking reference signal (PTRS) symbol structure;

a time domain PTRS resource element structure; or a combination thereof.

13. The method of claim 12, wherein the SSB channel structure is modified so that demodulation reference symbols are time division multiplexed with a physical broadcast channel (PBCH) before or after PBCH symbols for channel estimation, and PBCH symbols contain only PBCH resource elements.

14. The method of claim 12, wherein the DMRS structure comprises a DMRS split into two symbols multiplexed with a physical broadcast channel (PBCH) and a secondary synchronization signal (SSS) in a frequency domain so that each of the two symbols is in a different PBCH resource block group and a discrete Fourier transform is performed on each PBCH resource block group.

15. The method of claim 12, wherein the PDCCH structure is modified so that DMRS symbols are time division multiplexed with PDCCH resource elements.

16. The method of claim 12, wherein the PTRS symbol structure comprises PTRS symbols being inserted in a time domain prior to a discreate Fourier transform.

17. The method of claim 12, wherein the time domain PTRS resource element structure comprises time domain PTRS resource elements within a control channel element (CCE) grouped in bundles and the bundles are interleaved within the CCE.

18. The method of claim 12, wherein the time domain PTRS resource element structure comprises time domain PTRS resource elements within a control channel element (CCE) grouped together and placed contiguously at or near a middle of the CCE.

19. The method of claim 12, wherein the time domain PTRS resource element structure comprises time domain PTRS resource elements within a control channel element (CCE) grouped together and placed contiguously at or near a beginning or end of the CCE.

\* \* \* \* \*